United States Patent
Peterson

(10) Patent No.: US 10,158,847 B2
(45) Date of Patent: Dec. 18, 2018

(54) REAL—TIME STEREO 3D AND AUTOSTEREOSCOPIC 3D VIDEO AND IMAGE EDITING

(71) Applicant: VEFXi Corporation, North Plains, OR (US)

(72) Inventor: Craig Peterson, North Plains, OR (US)

(73) Assignee: VEFXi Corporation, North Plains, OR (US)

( * ) Notice: Subject to any disclaimer, the term of this patent is extended or adjusted under 35 U.S.C. 154(b) by 0 days.

(21) Appl. No.: 14/743,793

(22) Filed: Jun. 18, 2015

(65) Prior Publication Data

US 2015/0371450 A1 Dec. 24, 2015

Related U.S. Application Data

(60) Provisional application No. 62/014,269, filed on Jun. 19, 2014.

(51) Int. Cl.
*H04N 13/271* (2018.01)
*H04N 13/128* (2018.01)
*H04N 13/261* (2018.01)

(52) U.S. Cl.
CPC ......... *H04N 13/271* (2018.05); *H04N 13/128* (2018.05); *H04N 13/261* (2018.05)

(58) Field of Classification Search
CPC ........... H04N 13/0271; H04N 13/0018; H04N 13/0022; H04N 13/026; H04N 13/0285; H04N 13/0289; H04N 13/0292
USPC ......... 345/419; 715/716, 719, 720, 722, 723
See application file for complete search history.

(56) References Cited

U.S. PATENT DOCUMENTS

| 4,180,313 | A | | 12/1979 | Innuiya |
| 4,925,294 | A | * | 5/1990 | Geshwind .......... H04N 13/0018 348/E13.008 |
| 5,257,345 | A | * | 10/1993 | Malm .................... G06T 15/10 345/419 |
| 5,465,175 | A | | 11/1995 | Woodgate et al. |
| 5,650,876 | A | | 7/1997 | Davies et al. |
| 5,654,810 | A | | 8/1997 | Okamura et al. |
| 5,663,831 | A | | 9/1997 | Mashitani et al. |
| 5,731,853 | A | | 3/1998 | Taketomi et al. |
| 5,731,899 | A | | 3/1998 | Meyers |
| 5,751,383 | A | | 5/1998 | Yamanaka |

(Continued)

FOREIGN PATENT DOCUMENTS

| WO | 2012068532 A2 | 5/2012 |
| WO | 2013109252 A1 | 7/2013 |
| WO | 2015026017 A1 | 2/2015 |

OTHER PUBLICATIONS http://brorsoft.com/how-to/import-mp4-to-final-cut-pro.html, captured Aug. 17 2013 by Archive.org.*

(Continued)

*Primary Examiner* — Said Broome
*Assistant Examiner* — Jonathan M Cofino
(74) *Attorney, Agent, or Firm* — Chernoff, Vilhauer, LLP

(57) ABSTRACT

A system for creating a three dimensional image using a processor that includes receiving a digital two dimensional input image and the processor processing the two dimensional input image to determine a depth map further based upon receiving input from a user interface. The processor generates a three dimensional image based upon the two dimensional input image and the depth map.

32 Claims, 24 Drawing Sheets

(56) References Cited

U.S. PATENT DOCUMENTS

| | | |
|---|---|---|
| 5,757,545 A | 5/1998 | Wu et al. |
| 5,771,121 A | 6/1998 | Hentschke |
| 5,781,229 A | 7/1998 | Zediker et al. |
| 5,808,797 A | 9/1998 | Bloom et al. |
| 5,822,125 A | 10/1998 | Meyers |
| 5,825,552 A | 10/1998 | Kurtz et al. |
| 5,831,765 A | 11/1998 | Nakayama et al. |
| 5,841,579 A | 11/1998 | Bloom et al. |
| 5,852,512 A | 12/1998 | Chikazawa |
| 5,855,425 A | 1/1999 | Hamagishi |
| 5,864,375 A | 1/1999 | Taketomi et al. |
| 5,894,364 A | 4/1999 | Nagatani |
| 5,896,225 A | 4/1999 | Chikazawa |
| 5,914,805 A | 6/1999 | Crowley |
| 5,943,166 A | 8/1999 | Hoshi et al. |
| 5,969,850 A | 10/1999 | Harrold et al. |
| 5,969,872 A | 10/1999 | Ben Oren et al. |
| 5,982,553 A | 11/1999 | Bloom et al. |
| 5,986,804 A | 11/1999 | Mashitani et al. |
| 5,991,074 A | 11/1999 | Nose et al. |
| 5,993,003 A | 11/1999 | McLaughlin |
| 5,993,004 A | 11/1999 | Moseley et al. |
| 6,014,164 A | 1/2000 | Woodgate et al. |
| 6,014,187 A | 1/2000 | Taketomi et al. |
| 6,020,931 A | 2/2000 | Bilbrey et al. |
| 6,040,807 A | 3/2000 | Hamagishi et al. |
| 6,048,081 A | 4/2000 | Richardson |
| 6,049,352 A | 4/2000 | Allio |
| 6,061,083 A | 5/2000 | Aritake et al. |
| 6,064,424 A | 5/2000 | van Berkel et al. |
| 6,088,102 A | 7/2000 | Manhart |
| 6,097,554 A | 8/2000 | Watkins |
| 6,101,036 A | 8/2000 | Bloom |
| 6,130,770 A | 10/2000 | Bloom |
| 6,151,062 A | 11/2000 | Inoguchi et al. |
| 6,157,402 A | 12/2000 | Torgeson |
| 6,188,518 B1 | 2/2001 | Martin |
| 6,215,579 B1 | 4/2001 | Bloom et al. |
| 6,215,590 B1 | 4/2001 | Okano |
| 6,219,184 B1 | 4/2001 | Nagatani |
| 6,224,214 B1 | 5/2001 | Martin et al. |
| 6,225,979 B1 * | 5/2001 | Taima ............... G06F 3/04812 345/157 |
| 6,246,402 B1 * | 6/2001 | Setogawa ............ G11B 19/022 386/281 |
| 6,254,246 B1 | 7/2001 | Tiao et al. |
| 6,259,450 B1 | 7/2001 | Chiabrera et al. |
| 6,266,106 B1 | 7/2001 | Murata et al. |
| 6,266,176 B1 | 7/2001 | Anderson et al. |
| 6,271,808 B1 | 8/2001 | Corbin |
| 6,304,263 B1 | 10/2001 | Chiabrera et al. |
| 6,337,721 B1 | 1/2002 | Hamagishi et al. |
| 6,381,072 B1 | 4/2002 | Burger |
| 6,385,882 B1 | 5/2002 | Conley et al. |
| 6,388,815 B1 | 5/2002 | Collins, Jr. et al. |
| 6,445,406 B1 | 9/2002 | Taniguchi et al. |
| 6,462,871 B1 | 10/2002 | Morishima |
| 6,481,849 B2 | 11/2002 | Martin et al. |
| 6,525,889 B1 | 2/2003 | Collins, Jr. et al. |
| 6,533,420 B1 | 3/2003 | Eichenlaub |
| 6,547,628 B1 | 4/2003 | Long |
| 6,574,047 B2 | 6/2003 | Hawver |
| 6,608,965 B1 * | 8/2003 | Tobimatsu ............ G11B 15/02 360/13 |
| 6,674,939 B1 | 1/2004 | Anderson et al. |
| 6,697,042 B1 | 2/2004 | Cohen et al. |
| 6,700,701 B1 | 3/2004 | Son et al. |
| 6,707,591 B2 | 3/2004 | Amm |
| 6,712,480 B1 | 3/2004 | Leung et al. |
| 6,714,173 B2 | 3/2004 | Shinoura |
| 6,724,951 B1 | 4/2004 | Anderson et al. |
| 6,727,866 B2 | 4/2004 | Wang et al. |
| 6,728,023 B1 | 4/2004 | Alioshin et al. |
| 6,736,512 B2 | 5/2004 | Balogh |
| 6,747,781 B2 | 6/2004 | Trisnadi |
| 6,760,140 B1 | 7/2004 | Argueta-Diaz et al. |
| 6,764,875 B2 | 7/2004 | Shook |
| 6,766,073 B1 | 7/2004 | Anderson |
| 6,767,751 B2 | 7/2004 | Hunter |
| 6,775,048 B1 | 8/2004 | Starkweather et al. |
| 6,782,205 B2 | 8/2004 | Trisnadi et al. |
| 6,791,570 B1 | 9/2004 | Schwerdtner et al. |
| 6,795,250 B2 | 9/2004 | Johnson et al. |
| 6,800,238 B1 | 10/2004 | Miller |
| 6,801,354 B1 | 10/2004 | Payne et al. |
| 6,806,997 B1 | 10/2004 | Dueweke et al. |
| 6,813,059 B2 | 11/2004 | Hunter et al. |
| 6,822,797 B1 | 11/2004 | Carlisle et al. |
| 6,829,077 B1 | 12/2004 | Maheshwari |
| 6,829,092 B2 | 12/2004 | Amm et al. |
| 6,829,258 B1 | 12/2004 | Carlisle et al. |
| 6,877,882 B1 | 4/2005 | Haven et al. |
| 7,139,042 B2 | 11/2006 | Nam et al. |
| 7,154,653 B2 | 12/2006 | Kean et al. |
| 7,161,614 B1 | 1/2007 | Yamashita et al. |
| 7,168,249 B2 | 1/2007 | Starkweather et al. |
| 7,215,474 B2 | 5/2007 | Argueta-Diaz |
| 7,236,238 B1 | 6/2007 | Durresi et al. |
| 7,271,945 B2 | 9/2007 | Hagood et al. |
| 7,286,280 B2 | 10/2007 | Whitehead et al. |
| 7,295,264 B2 | 11/2007 | Kim |
| 7,298,552 B2 | 11/2007 | Redert |
| 7,304,785 B2 | 12/2007 | Hagood et al. |
| 7,304,786 B2 | 12/2007 | Hagood et al. |
| 7,311,607 B2 | 12/2007 | Tedsen et al. |
| 7,365,897 B2 | 4/2008 | Hagood et al. |
| 7,405,852 B2 | 7/2008 | Brosnihan et al. |
| 7,417,782 B2 | 8/2008 | Hagood et al. |
| 7,425,069 B2 | 9/2008 | Schwerdtner et al. |
| 7,430,347 B2 | 9/2008 | Anderson et al. |
| 7,432,878 B1 | 10/2008 | Nayar et al. |
| 7,450,304 B2 | 11/2008 | Sakai et al. |
| 7,502,159 B2 | 3/2009 | Hagood, IV et al. |
| 7,518,663 B2 | 4/2009 | Cornelissen |
| 7,551,344 B2 | 6/2009 | Hagood et al. |
| 7,551,353 B2 | 6/2009 | Kim et al. |
| 7,614,748 B2 | 11/2009 | Nayar et al. |
| 7,616,368 B2 | 11/2009 | Hagood, IV |
| 7,619,806 B2 | 11/2009 | Hagood, IV et al. |
| 7,630,598 B2 | 12/2009 | Anderson et al. |
| 7,633,670 B2 | 12/2009 | Anderson et al. |
| 7,636,189 B2 | 12/2009 | Hagood, IV et al. |
| 7,651,282 B2 | 1/2010 | Zomet et al. |
| 7,660,499 B2 | 2/2010 | Anderson et al. |
| 7,675,665 B2 | 3/2010 | Hagood et al. |
| 7,703,924 B2 | 4/2010 | Nayar |
| 7,742,016 B2 | 6/2010 | Hagood et al. |
| 7,746,529 B2 | 6/2010 | Hagood et al. |
| 7,750,982 B2 | 7/2010 | Nelson et al. |
| 7,755,582 B2 | 7/2010 | Hagood et al. |
| 7,817,045 B2 | 10/2010 | Onderko |
| 7,839,356 B2 | 11/2010 | Hagood et al. |
| 7,852,546 B2 | 12/2010 | Fijol et al. |
| 7,857,700 B2 | 12/2010 | Wilder et al. |
| 7,864,419 B2 | 1/2011 | Cossairt et al. |
| 7,876,489 B2 | 1/2011 | Gandhi et al. |
| 7,889,425 B1 | 2/2011 | Connor |
| 7,891,815 B2 | 2/2011 | Nayar et al. |
| 7,911,671 B2 | 3/2011 | Rabb |
| 7,927,654 B2 | 4/2011 | Hagood et al. |
| 7,978,407 B1 | 7/2011 | Connor |
| 8,134,779 B2 | 3/2012 | Roh et al. |
| 8,149,348 B2 | 4/2012 | Yun et al. |
| 8,159,428 B2 | 4/2012 | Hagood et al. |
| 8,174,632 B2 | 5/2012 | Kim et al. |
| 8,179,424 B2 | 5/2012 | Moller |
| 8,189,039 B2 | 5/2012 | Hiddink et al. |
| 8,242,974 B2 | 8/2012 | Yamazaki et al. |
| 8,248,560 B2 | 8/2012 | Kim et al. |
| 8,262,274 B2 | 9/2012 | Kim et al. |
| 8,310,442 B2 | 11/2012 | Hagood et al. |
| 8,363,100 B2 | 1/2013 | Lu |
| 8,402,502 B2 | 3/2013 | Meuninck et al. |
| 8,441,602 B2 | 5/2013 | Kim et al. |

(56) References Cited

U.S. PATENT DOCUMENTS

| | | |
|---|---|---|
| 8,446,559 B2 | 5/2013 | Kim et al. |
| 8,482,496 B2 | 7/2013 | Lewis |
| 8,519,923 B2 | 8/2013 | Hagood, IV et al. |
| 8,519,945 B2 | 8/2013 | Hagood et al. |
| 8,520,285 B2 | 8/2013 | Fike, III et al. |
| 8,526,096 B2 | 9/2013 | Steyn et al. |
| 8,545,048 B2 | 10/2013 | Kang et al. |
| 8,545,084 B2 | 10/2013 | Kim et al. |
| 8,558,961 B2 | 10/2013 | Yun et al. |
| 8,587,498 B2 | 11/2013 | Connor |
| 8,587,635 B2 | 11/2013 | Hines et al. |
| 8,593,574 B2 | 11/2013 | Ansari et al. |
| 8,599,463 B2 | 12/2013 | Wu et al. |
| 8,640,182 B2 | 1/2014 | Bedingfield, Sr. |
| 8,651,684 B2 | 2/2014 | Mehrle |
| 8,651,726 B2 | 2/2014 | Robinson |
| 8,659,830 B2 | 2/2014 | Brott et al. |
| 8,675,125 B2 | 3/2014 | Cossairt et al. |
| 8,711,062 B2 | 4/2014 | Yamazaki et al. |
| 8,736,675 B1 | 5/2014 | Holzbach et al. |
| 8,786,685 B1 | 7/2014 | Sethna et al. |
| 8,817,082 B2 | 8/2014 | Van Der Horst et al. |
| 8,860,790 B2 | 10/2014 | Ericson et al. |
| 8,891,152 B2 | 11/2014 | Fike, III et al. |
| 8,897,542 B2 | 11/2014 | Wei |
| 8,917,441 B2 | 12/2014 | Woodgate et al. |
| 8,918,831 B2 | 12/2014 | Meuninck et al. |
| 8,937,767 B2 | 1/2015 | Chang et al. |
| 8,947,385 B2 | 2/2015 | Ma et al. |
| 8,947,497 B2 | 2/2015 | Hines et al. |
| 8,947,511 B2 | 2/2015 | Friedman |
| 8,964,009 B2 | 2/2015 | Yoshida |
| 8,988,343 B2 | 3/2015 | Fei et al. |
| 8,994,716 B2 | 3/2015 | Malik |
| 9,001,423 B2 | 4/2015 | Woodgate et al. |
| 9,024,927 B2 | 5/2015 | Koyama |
| 9,030,522 B2 | 5/2015 | Hines et al. |
| 9,030,536 B2 | 5/2015 | King et al. |
| 9,032,470 B2 | 5/2015 | Meuninck et al. |
| 9,049,426 B2 | 6/2015 | Costa et al. |
| 9,082,353 B2 | 7/2015 | Lewis et al. |
| 9,086,778 B2 | 7/2015 | Friedman |
| 9,087,486 B2 | 7/2015 | Gandhi et al. |
| 9,116,344 B2 | 8/2015 | Wu et al. |
| 9,128,277 B2 | 9/2015 | Steyn et al. |
| 9,134,552 B2 | 9/2015 | Ni Chleirigh et al. |
| 9,135,868 B2 | 9/2015 | Hagood, IV et al. |
| 9,158,106 B2 | 10/2015 | Hagood et al. |
| 9,160,968 B2 | 10/2015 | Hines et al. |
| 9,167,205 B2 | 10/2015 | Hines et al. |
| 9,176,318 B2 | 11/2015 | Hagood et al. |
| 9,177,523 B2 | 11/2015 | Hagood et al. |
| 9,182,587 B2 | 11/2015 | Brosnihan et al. |
| 9,182,604 B2 | 11/2015 | Cossairt et al. |
| 9,188,731 B2 | 11/2015 | Woodgate et al. |
| 9,229,222 B2 | 1/2016 | Hagood et al. |
| 9,232,274 B2 | 1/2016 | Meuninck et al. |
| 9,235,057 B2 | 1/2016 | Robinson et al. |
| 9,237,337 B2 | 1/2016 | Ramsey et al. |
| 9,243,774 B2 | 1/2016 | Kim et al. |
| 9,247,228 B2 | 1/2016 | Malik |
| 9,250,448 B2 | 2/2016 | Robinson |
| 9,261,641 B2 | 2/2016 | Sykora et al. |
| 9,261,694 B2 | 2/2016 | Payne et al. |
| 2002/0008704 A1* | 1/2002 | Sheasby ............. G06T 13/40 345/475 |
| 2003/0067421 A1 | 4/2003 | Sullivan |
| 2003/0128205 A1* | 7/2003 | Varghese ............. G06T 17/00 345/419 |
| 2003/0197933 A1 | 10/2003 | Sudo et al. |
| 2004/0165264 A1 | 8/2004 | Uehara et al. |
| 2004/0174604 A1 | 9/2004 | Brown |
| 2004/0192430 A1 | 9/2004 | Burak et al. |
| 2005/0059487 A1 | 3/2005 | Wilder et al. |
| 2005/0083400 A1 | 4/2005 | Hirayama et al. |
| 2005/0111100 A1 | 5/2005 | Mather et al. |
| 2005/0190443 A1 | 9/2005 | Nam et al. |
| 2006/0023065 A1 | 2/2006 | Alden |
| 2006/0039181 A1 | 2/2006 | Yang et al. |
| 2006/0044987 A1 | 3/2006 | Anderson et al. |
| 2006/0078180 A1 | 4/2006 | Berretty |
| 2006/0244918 A1 | 11/2006 | Cossairt et al. |
| 2006/0262122 A1* | 11/2006 | Hoddie ............. G11B 27/034 345/473 |
| 2007/0146358 A1 | 6/2007 | Ijzerman |
| 2007/0165305 A1 | 7/2007 | Mehrle |
| 2007/0222954 A1 | 9/2007 | Hattori |
| 2007/0229778 A1 | 10/2007 | Cha et al. |
| 2007/0255139 A1 | 11/2007 | Deschinger et al. |
| 2007/0268590 A1 | 11/2007 | Schwerdtner |
| 2008/0079662 A1 | 4/2008 | Saishu et al. |
| 2008/0094853 A1 | 4/2008 | Kim et al. |
| 2008/0123182 A1 | 5/2008 | Cernasov |
| 2008/0204550 A1 | 8/2008 | De Zwart et al. |
| 2008/0211734 A1 | 9/2008 | Huitema et al. |
| 2008/0225114 A1 | 9/2008 | De Zwart et al. |
| 2008/0247042 A1 | 10/2008 | Scwerdtner |
| 2008/0259233 A1 | 10/2008 | Krijn et al. |
| 2008/0281767 A1 | 11/2008 | Garner |
| 2008/0291267 A1 | 11/2008 | Leveco et al. |
| 2008/0316303 A1 | 12/2008 | Chiu et al. |
| 2008/0316604 A1 | 12/2008 | Redert et al. |
| 2009/0002335 A1 | 1/2009 | Chaudhri |
| 2009/0051759 A1 | 2/2009 | Adkins et al. |
| 2009/0217209 A1 | 8/2009 | Chen et al. |
| 2009/0237564 A1* | 9/2009 | Kikinis ............. H04N 13/0497 348/584 |
| 2009/0309887 A1 | 12/2009 | Moller et al. |
| 2009/0309958 A1 | 12/2009 | Hamagishi et al. |
| 2010/0007582 A1 | 1/2010 | Zalewski |
| 2010/0026795 A1 | 2/2010 | Moller et al. |
| 2010/0026797 A1 | 2/2010 | Meuwissen et al. |
| 2010/0033813 A1 | 2/2010 | Rogoff |
| 2010/0050080 A1* | 2/2010 | Libert ............. G06F 17/30038 715/716 |
| 2010/0080448 A1* | 4/2010 | Tam ............. G06T 7/0051 382/154 |
| 2010/0097687 A1 | 4/2010 | Lipovetskaya et al. |
| 2010/0110316 A1 | 5/2010 | Huang et al. |
| 2010/0165081 A1 | 7/2010 | Jung et al. |
| 2010/0188572 A1* | 7/2010 | Card, II ............. H04N 5/445 348/468 |
| 2010/0245548 A1 | 9/2010 | Sasaki et al. |
| 2010/0302237 A1* | 12/2010 | Aramaki ............. H04N 13/0497 345/419 |
| 2010/0309287 A1* | 12/2010 | Rodriguez ............. H04N 13/0059 348/43 |
| 2010/0309290 A1 | 12/2010 | Myers |
| 2011/0000971 A1 | 1/2011 | Onderko |
| 2011/0012897 A1* | 1/2011 | Stanton ............. G01N 23/046 345/419 |
| 2011/0013258 A1 | 1/2011 | Lee et al. |
| 2011/0032483 A1 | 2/2011 | Hruska et al. |
| 2011/0074770 A1* | 3/2011 | Robinson ............. G06T 15/20 345/419 |
| 2011/0074773 A1 | 3/2011 | Jung |
| 2011/0085094 A1 | 4/2011 | Kao et al. |
| 2011/0109629 A1 | 5/2011 | Ericson et al. |
| 2011/0134109 A1* | 6/2011 | Izumi ............. G06T 15/205 345/419 |
| 2011/0149030 A1 | 6/2011 | Kang et al. |
| 2011/0188773 A1 | 8/2011 | Wei et al. |
| 2011/0210964 A1 | 9/2011 | Chiu et al. |
| 2011/0234605 A1 | 9/2011 | Smith et al. |
| 2011/0246877 A1 | 10/2011 | Kwak et al. |
| 2011/0249026 A1 | 10/2011 | Singh |
| 2011/0254929 A1 | 10/2011 | Yang et al. |
| 2011/0291945 A1 | 12/2011 | Ewing, Jr. et al. |
| 2011/0316679 A1 | 12/2011 | Pihlaja |
| 2012/0013606 A1 | 1/2012 | Tsai et al. |
| 2012/0019883 A1 | 1/2012 | Chae et al. |
| 2012/0026586 A1 | 2/2012 | Chen |

(56) References Cited

U.S. PATENT DOCUMENTS

| | | |
|---|---|---|
| 2012/0038745 A1* | 2/2012 | Yu .................... H04N 13/0022 348/46 |
| 2012/0050262 A1 | 3/2012 | Kim et al. |
| 2012/0057006 A1 | 3/2012 | Joseph et al. |
| 2012/0057229 A1 | 3/2012 | Kikuchi et al. |
| 2012/0062549 A1 | 3/2012 | Woo et al. |
| 2012/0069019 A1 | 3/2012 | Richards |
| 2012/0069146 A1 | 3/2012 | Lee et al. |
| 2012/0081359 A1 | 4/2012 | Lee et al. |
| 2012/0102436 A1 | 4/2012 | Nurmi |
| 2012/0113018 A1 | 5/2012 | Yan |
| 2012/0154559 A1 | 6/2012 | Voss et al. |
| 2012/0194506 A1* | 8/2012 | Passmore ................ G06T 15/00 345/419 |
| 2012/0202187 A1 | 8/2012 | Brinkerhoff, III |
| 2012/0206484 A1 | 8/2012 | Hauschild et al. |
| 2012/0223879 A1 | 9/2012 | Winter |
| 2012/0229450 A1 | 9/2012 | Kim et al. |
| 2012/0229718 A1 | 9/2012 | Huang et al. |
| 2012/0249534 A1* | 10/2012 | Kanagawa ......... H04N 13/0022 345/419 |
| 2012/0249836 A1 | 10/2012 | Ali et al. |
| 2012/0262398 A1 | 10/2012 | Kim et al. |
| 2012/0274626 A1 | 11/2012 | Hsieh |
| 2012/0274634 A1* | 11/2012 | Yamada ................ G06T 7/0051 345/419 |
| 2013/0027390 A1 | 1/2013 | Kim et al. |
| 2013/0038611 A1 | 2/2013 | Noritake et al. |
| 2013/0057647 A1* | 3/2013 | Moon .................. H04N 13/026 348/43 |
| 2013/0127846 A1* | 5/2013 | Isogai .................... G06T 15/00 345/419 |
| 2013/0127989 A1* | 5/2013 | Chen .................... H04N 13/026 348/43 |
| 2013/0202221 A1 | 8/2013 | Tsai et al. |
| 2014/0035902 A1 | 2/2014 | An et al. |
| 2014/0036173 A1 | 2/2014 | Chang |
| 2014/0192172 A1 | 7/2014 | Kang et al. |
| 2014/0223482 A1* | 8/2014 | McIntosh ............. G11B 27/105 725/41 |
| 2014/0267243 A1* | 9/2014 | Venkataraman ...... G06T 7/0065 345/419 |
| 2014/0355302 A1 | 12/2014 | Wilcox et al. |
| 2015/0070481 A1 | 3/2015 | S. et al. |
| 2015/0113400 A1* | 4/2015 | Andrianakou .......... H04L 67/10 715/716 |
| 2015/0116457 A1 | 4/2015 | Barkatullah |
| 2015/0116458 A1 | 4/2015 | Barkatullah |
| 2015/0185957 A1 | 7/2015 | Weng et al. |
| 2015/0226972 A1 | 8/2015 | Wang |
| 2015/0260999 A1 | 9/2015 | Wang et al. |
| 2015/0279083 A1* | 10/2015 | Pradeep .................. G06T 7/0075 345/419 |
| 2015/0341616 A1 | 11/2015 | Siegel et al. |

OTHER PUBLICATIONS

International Search Report and Written Opinion, PCT International Patent Application No. PCT/US2016/061313, Craig Peterson, dated Jan. 19, 2017, 22 pages.

* cited by examiner

MediaReactor Profile

Description [_____]

Video Settings

| | |
|---|---|
| File Type | mov -- QuickTime Movie File |
| Codec ID | Media 100 Macintosh |
| Width | 720  Height 486 |
| Bit Depth | 24  Data Rate 3200 |
| Key Frame | 1  Quality 10000 |

Audio Settings

☐ Separate  ☐ Audi-Only  ☐ Dual Mono

| | |
|---|---|
| File Type | wave -- Old Microsoft WAVE RIFF |
| Codec ID | Uncompressed |
| Sample Rate | 48000  Quality 320 |
| Bits/Sample | 16 |

Filter Settings

☐ Enable  Blend Fields

Value  Option

☐ 2/3 Drop  ☐ Add  ☐ Remove  00:0:0:00

[Load]  [Save As]  [Close]  [Set]

FIG. 7

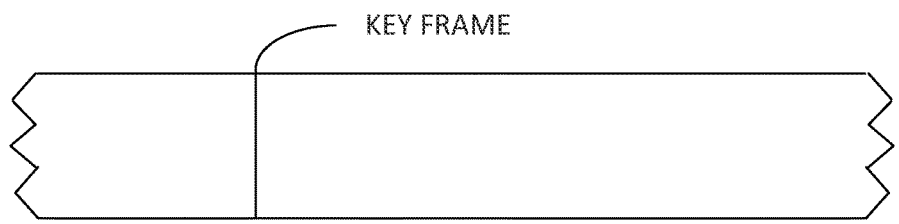
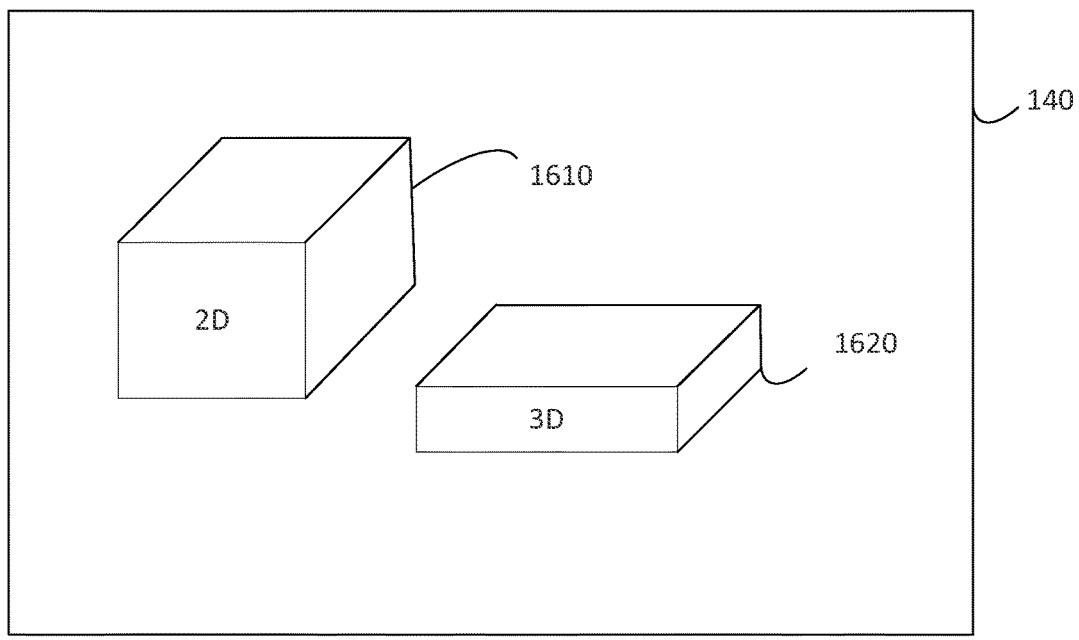
FIG. 16

| CONFIGURATION | BIT(S) | DESCRIPTION | DEFAULT |
|---|---|---|---|
| | | | |
| LEFT/RIGHT EYE SWAP (1800) | 1 | 0:TURN OFF L/R EYE SWAPPING<br>1:TURN ON L/R EYE SWAPPING | 0 |
| BACKGROUND TILT (1802) | 1 | 0:TURN OFF BACKGROUND TILT<br>1:TURN ON BACKGROUND TILT | 1 |
| DEPTH MAP ESTIMATION TECHNIQUE (1804) | 4 | 0000:DEFAULT TECHNIQUE<br>0001:TECHNIQUE 1<br>...<br>1111:TECHNIQUE 15 | 0000 |
| SEGMENTATION TECHNIQUE (1806) | 3 | 000:STEP<br>0001:SCALE<br>010:STEP + SCALE<br>011: SCALE + STEP | 000 |
| CONTROL CODE LOCATION (1808) | 1 | 0:INSIDE VISIBLE SCREEN<br>1:2 LINES IMMEDIATELY BEFORE FIRST VISIBLE LINE IN | 0 |
| 3D CONVERSION (1810) | 1 | 0:BYPASS<br>1:ENABLE CONVERSION | 1 |
| SEGMENTATION SCALE VALUE (1812) | 3 | 000:SCALE FACTOR 1.00<br>001:SCALE FACTOR 1.11<br>010:SCALE FACTOR 1.23<br>011:SCALE FACTOR 1.37<br>100:SCALE FACTOR 1.52<br>101:SCALE FACTOR 1.69<br>110:SCALE FACTOR 1.88<br>111:SCALE FACTOR 2.00 | 000 |
| ZERO PLANE POSITION (1814) | 8 | XXXXXXXX:SET THE DEPTH VALUE FROM 0 TO 255 TO ADJUST THE DEPTH LEVEL FOR OFFSET=0 | 60 |
| DYNAMIC RANGE ADJUSTMENT (1816) | 6 | SET VALUE FROM 24 TO 63 PIXELS FOR MAXIMUM OFFSET | 10 |
| SEGMENTATION BREAKPOINT (1818) | 8 | SET THE VALUE FROM 0 TO 255 (DEPTH UNIT SCALE) FOR THE BREAKPOINT TO INCREASE THE OBJECT SEGMENTATION | 00 |
| SEGMENTATION STEP SIZE (1820) | 5 | SET THE VALUE FROM 0 TO 31 FOR THE STEP SIZE OF THE OBJECT SEGMENTATION | 00 |
| CONTROL CODE HIDING TECHNIQUE (1822) | 3 | 000:DO NOT HIDE<br>001:COPY PIXEL FROM LINE ABOVE<br>010:COPY PIXELS FROM PREVIOUS FRAME<br>011:BLACK OUT THE ENTIRE TWO ROWS | 001 |

FIG. 18

REAL—TIME STEREO 3D AND AUTOSTEREOSCOPIC 3D VIDEO AND IMAGE EDITING

CROSS-REFERENCE TO RELATED APPLICATIONS

This application claims the benefit of U.S. Provisional App. No. 62/014,269, filed Jun. 19, 2014.

BACKGROUND OF THE INVENTION

Two dimensional video content, such as obtained with a video camera having a single aperture, is often either projected onto a display screen for viewing or viewed on a display designed for presenting two dimensional content. Over time, the resolution of displays has tended to increase, from standard television interlaced content resolution (e.g., 480$i$), to high definition television content (e.g., 1080$i$), to 4K definition television content (4K UHD), and even to even higher definition television content (e.g., 8K UHD). Such increases in video resolution technology only provide for limited increases in the apparent image quality to the viewer. Accordingly, the viewer is only immersed in the video experience to a limited extent.

To increase the immersive experience of the viewer it is desirable to effectively convert two dimensional image content into three dimensional image content, which is thereafter displayed on a suitable display for viewing three dimensional image content. The perception of three dimensional content may involve a third dimension of depth, which may be perceived in a form of binocular disparity by the human visual system. Since the left and the right eyes of the viewer are at different positions, each perceives a slightly different view of a field of view. The human brain may then reconstruct the depth information from these different views to perceive a three dimensional view. To emulate this phenomenon, a three dimensional display may display two or more slightly different images of each scene in a manner that presents each of the views to a different eye of the viewer. A variety of different display technologies may be used, such as for example, anaglyph three dimensional system, polarized three dimensional system, active shutter three dimensional system, head mounted stereoscopic display system, and auto stereoscopic display system.

As three dimensional display systems become more readily prevalent the desire for suitable three dimensional content to present on such displays increases. One way to generate three dimensional content is using three dimensional computer generated graphics. While such content is suitable for being displayed, the amount of desirable such three dimensional computer generated content is limited. Another way to generate there dimensional content is using three dimensional video camera systems. Likewise, while such video camera content is suitable for being displayed, the amount of desirable such three dimensional content is likewise limited. A preferable technique to generate three dimensional content is using the vast amounts of available two dimensional content and converting the two dimensional content into three dimensional content. While such conversion of two dimensional content (2D) to three dimensional content (3D) conversation is desirable, the techniques are complicated and labor intensive.

The foregoing and other objectives, features, and advantages of the invention may be more readily understood upon consideration of the following detailed description of the invention, taken in conjunction with the accompanying drawings.

BRIEF DESCRIPTION OF THE SEVERAL VIEWS OF THE DRAWINGS

FIG. 7 illustrates an exemplary export interface.

FIG. 16 illustrates an exemplary display with spatial 2D and 3D regions.

FIG. 18 illustrates exemplary control codes.

DETAILED DESCRIPTION OF PREFERRED EMBODIMENT

One technique to achieve two dimensional (2D) to three dimensional (3D) conversion is using a modified time difference technique. The modified time difference technique converts 2D images to 3D images by selecting images that would be a stereo-pair according to the detected motions of objects in the input sequential images. This technique may, if desired, be based upon motion vector information available in the video or otherwise determined.

Figure 1:
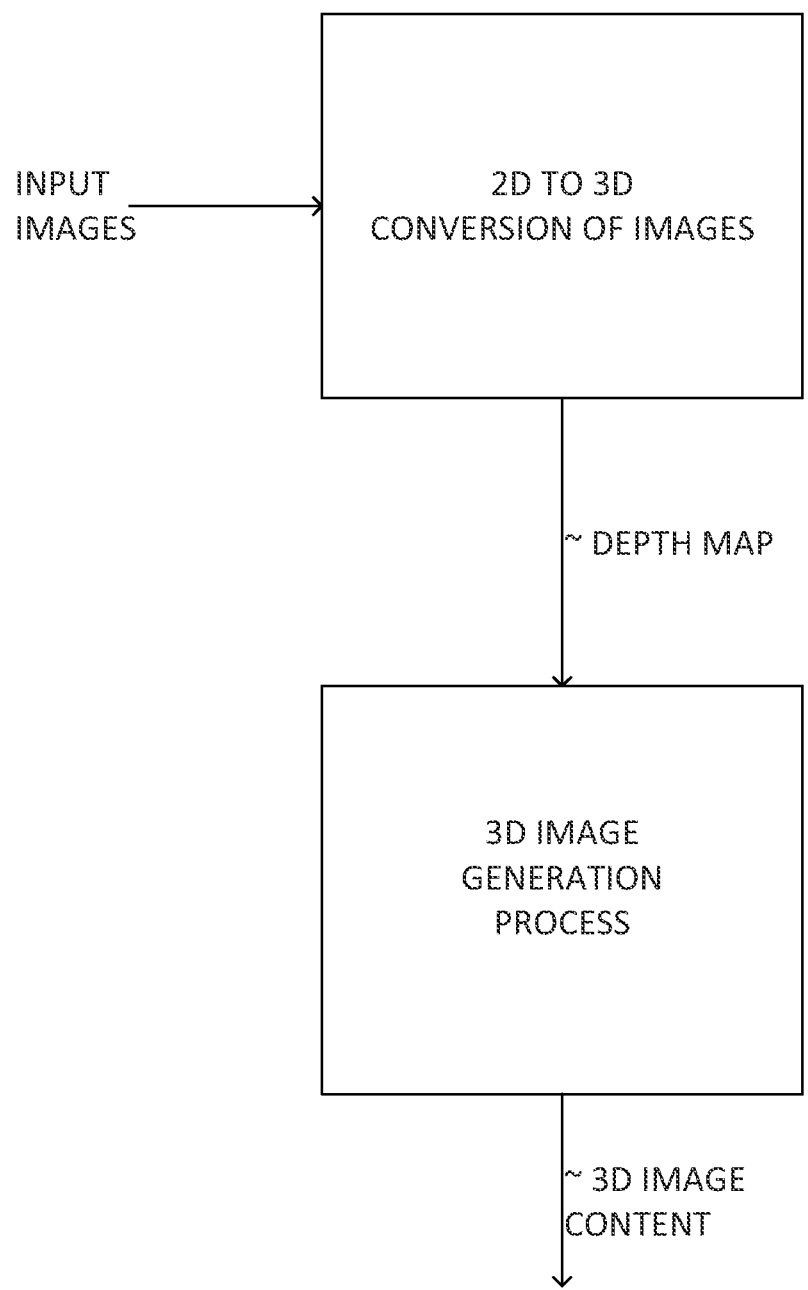
FIG. 1 illustrates an exemplary two dimension to three dimension image conversion process.

Another technique to achieve two dimensional (2D) to three dimensional (3D) conversion is using a computed image depth technique. The 3D images are generated based upon the characteristics of each 2D image. The characteristics of the image that may be used, include for example, the contrast of different regions of the image, the sharpness of different regions of the image, and the chrominance of different regions of the image. The sharpness, contrast, and chrominance values of each area of the input image may be determined. The sharpness relates to the high frequency content of the luminance signal of the input image. The contrast relates to a medium frequency content of the luminance signal of the input image. The chrominance relates the hue and the tone content of the color signal of the input image. Adjacent areas that have close color may be grouped together according to their chrominance values. The image depth may be computed using these characteristics and/or other characteristics, as desired. For example, generally near positioned objects have higher sharpness and higher contrast than far positioned objects and the background image. Thus, the sharpness and contrast may be inversely proportional to the distance. These values may likewise be weighted based upon their spatial location within the image. Other techniques may likewise be used to achieve a 2D to 3D conversion of an input image, including motion compensation, if desired. Referring to FIG. 1, with a suitable depth map from the 2D to 3D conversion process, a 3D image generation process may be used to generate the 3D images based upon the image depth map.

Figure 2:
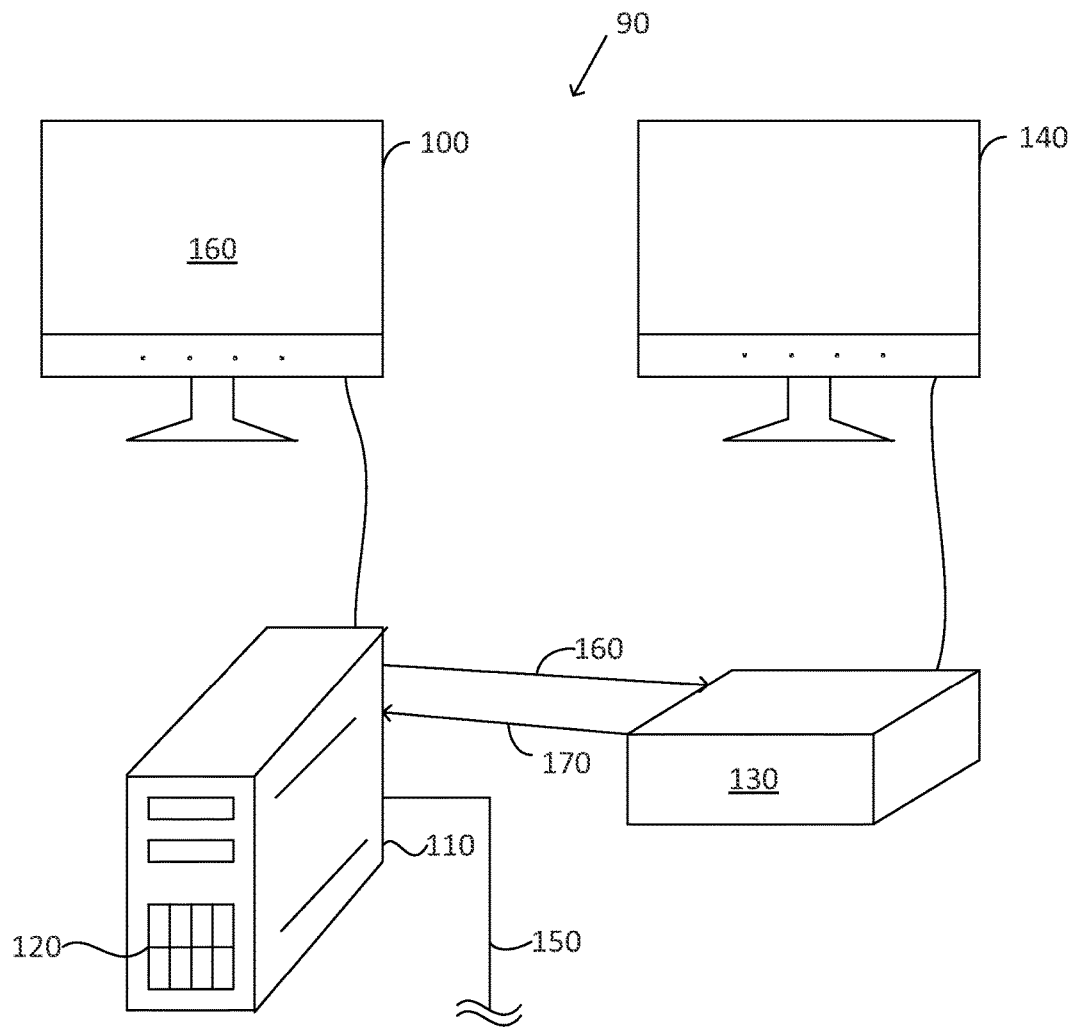
FIG. 2 illustrates an exemplary 2D to 3D image conversion system.

Completely automatic 2D to 3D conversion processes typically result in sub-optimal three dimensional image content and is preferably modified or otherwise controlled by a user in some manner to improve the resulting three dimensional image content. Referring to FIG. 2, a computer system 90 may be used by a user to modify the depth parameters (e.g., depth map and/or 3D generation process) for the rendered three dimensional content. The computer system may include a two dimensional display 100, a general purpose computing system 110, a storage system 120, a two dimensional to three dimensional image (2D-3D) conversion system 130, and a three dimensional display 140.

The video content may be stored on the storage system 120, available from a network 150, or otherwise, and processed by the computing system 110. The user may use the display 100 as a user interface 160 for selecting three dimensional control parameters for the video content. The control parameters may be used to modify the 2D to 3D conversion process. The computing system may provide the 2D video content and/or control parameters 160 for the 2D to 3D conversion system 130, as described in detail later. The 2D-3D conversion system 130 then processes the 2D video content, based at least in part on the control parameters 160 provided (if any), to generate 3D video content. Preferably the 2D video is provided together with the control parameters 160 from the computing system 110 to the conversion system 130. For example, (1) the video content may be provided as a single video stream where the left and right images are contained in a single video stream, and/or (2) the video content may be provided as two separate video streams with a full video stream for the left eye's content and a full video stream for the right eye's content. The 3D video content, as a result of the conversion system 130, is rendered on the three dimensional display 140 so that the user may observe the effects of the control parameters 160 in combination with the 2D to 3D conversion 130. The user may modify the control parameters 160, such as by modifying selections on the user interface 160, for the video content until suitable 3D images are rendered on the three dimensional display 140. The resulting three dimensional content 170 from the 2D-3D conversion system 130 may be provided to the computing system 110, which may be stored in a three dimensional video format (e.g., Dolby 3D, XpanD 3D, Panavision 3D, MasterImage 3D, IMAX 3D), for subsequent rendering on a three dimensional display. The 2D-3D conversion 130 is preferably an external converter to the computing system 110. Alternatively, the 2D-3D conversion 130 may be an add-on hardware device, such as a processing device on a PCI card maintained within in the computing system 110. Alternatively, the 2D-3D conversion process may be performed by a processing device within the computing system 110, such as for example, a graphics card. Alternatively, the 2D-3D conversion process may be performed by a program running on the computer system 110. Alternatively, the 3D display 140 and the 2D display 100 may be replaced by a single 3D display. As it may be observed, the system may be used to modify the two dimensional content using control parameters in a manner suitable to improve the three dimensional representation of the image content.

It is desirable to include a suitable user interface 160 that facilitates the user to efficiently and effectively adjust the conversion of the 2D video content to the 3D video content. To achieve this conversion, it was determined that the 2D to 3D conversion for video segments of the video content that have relatively similar content tend to have sufficiently similar control parameters to achieve desirable results. A key frame detection system may be used to process the video stream to automatically identify a set of key frames within the video stream. A key frame may be representative of a series of frames of a video stream, such as a scene or clip of video stream. By way of example, the key frame detection may be based upon a histogram of the video content, where a sufficient difference between adjacent histograms of video frames, may be used to indicate a key frame. In other cases, it is desirable for the user to manually identify each of the key frames. In this manner, the video content between adjacent key frames tends to be sufficiently similar that an automatic 2D to 3D conversion coupled with control parameters tends to provide sufficient 3D image quality for a segment or clip, where the key frame is the first frame (or any suitable frame(s)) of a video segment having sufficiently similar content.

Figure 3:
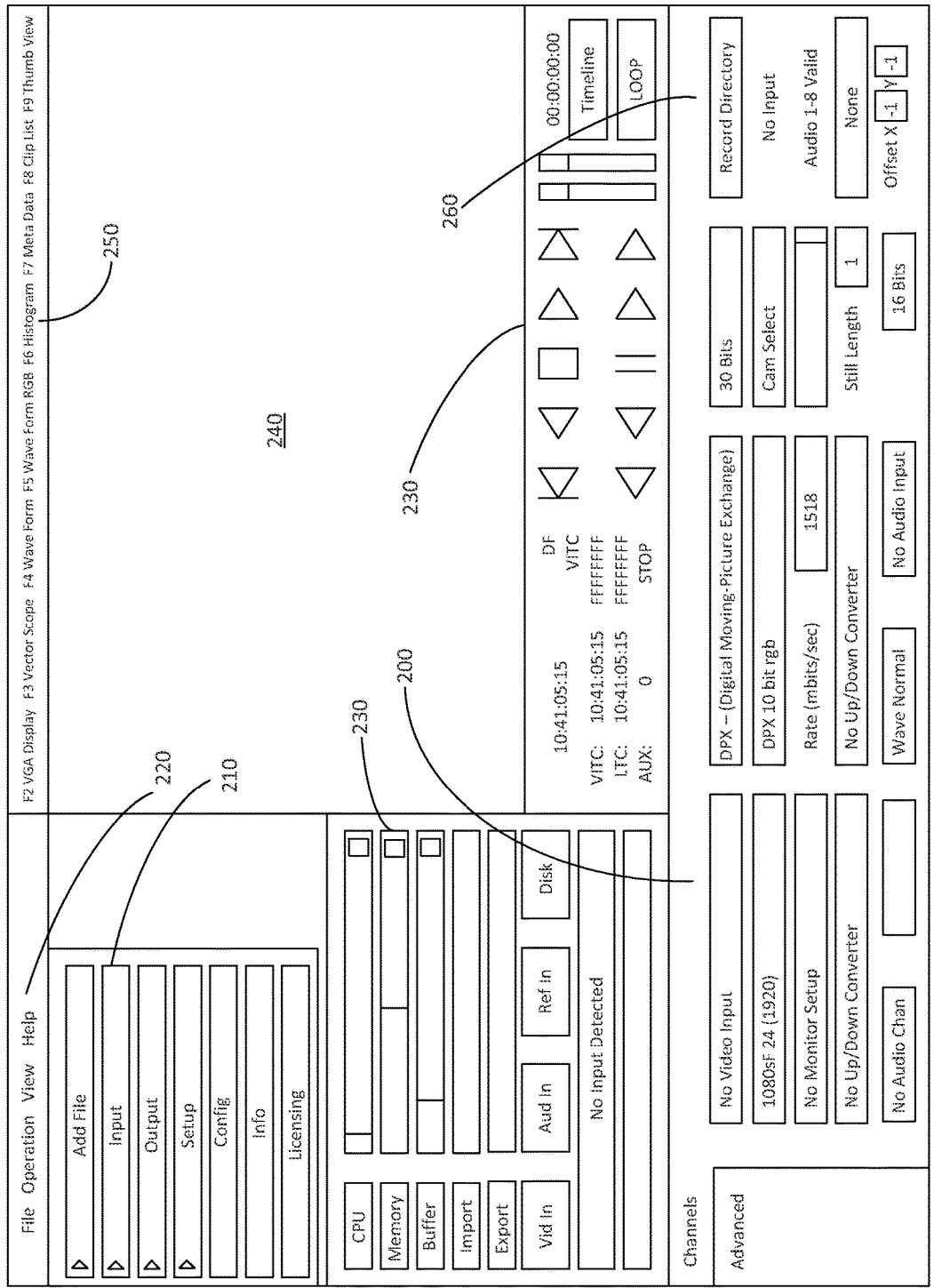
FIG. 3 illustrates an interface for an image conversion system.

Referring to FIG. 3, the user interface 160 may include many different functions simultaneously displayed on the interface in a manner that provides for efficient modification of the 2D to 3D conversion process. An operations section 200 contains controls and displays specific to the operation being performed. A main menu 210 contains controls for files, for operations, for a view selector, and for a help menu. An operations selector 220 allows the user to select input, output, and setup operations, and indicates which operations the system is currently set to. For example, these dialogs may also be accessed through the main menu under operations. A system display 230 shows the CPU performance, the memory performance, the buffer level, the progress bars for input and export operations, the video, the audio, the reference, and disk parameters, as well as the video standard the system is set to. A view section 240 is used to display the VGA monitor, vector scope, wave form monitor, RGB wave form monitor, histogram, clip list, thumb view, and log/output window, depending on what is selected in a view selector or in the main menu under view. The view selector 250 allows the user to select what will be displayed in the view section. A transport controls and display 260 provides "real time" display of time code location, standard, time code type, transport state, secondary time code information, as well as transport controls for playback and cueing and audio meters.

Figure 4:
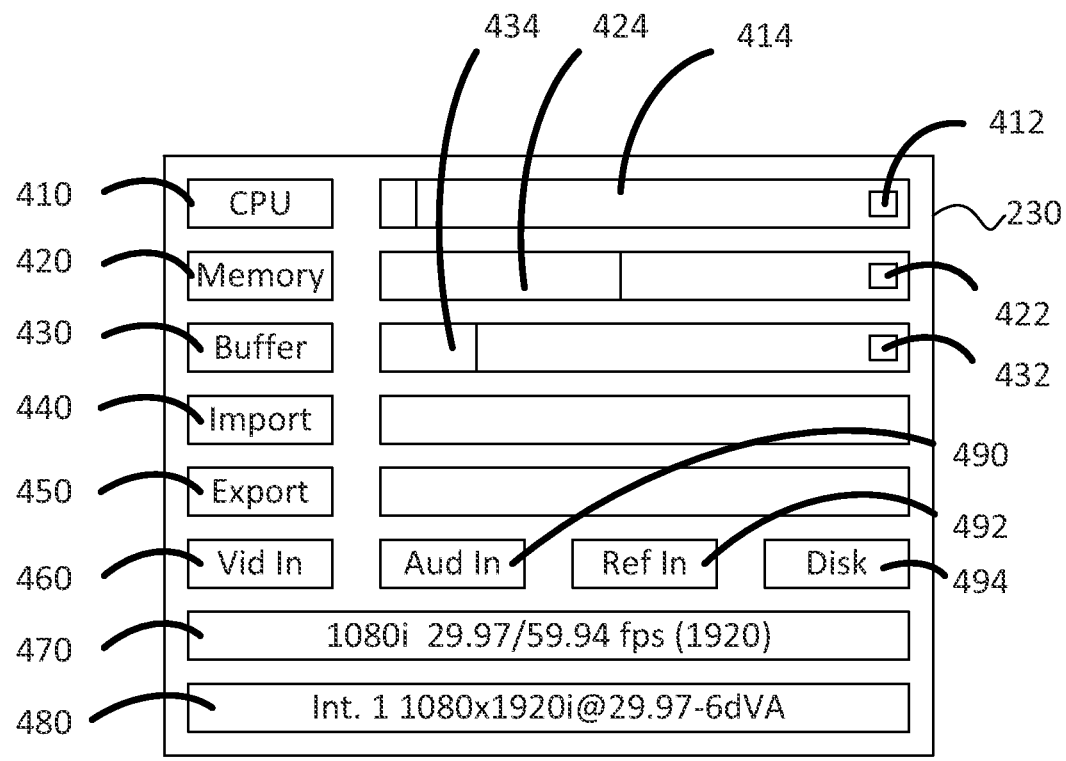
FIG. 4 illustrates an exemplary system display.

Referring to FIG. 4, the system display 230 may include a cpu display 410, a memory usage meter 420, a buffer usage meter 430, an import progress meter 440, an export progress meter 450, a video input status display 460, a video standard status display 470, a channel drop down menu 480, an audio input status display 490, a reference input status display 492, and a disk status display 494. The cpu display 410 and checkbox 412 displays a usage level meter 414 for the processor (CPU). The checkbox 412 enables the usage level meter 414 when checked and disables it when de-checked. The memory usage meter 420 displays a usage level meter 424 for the memory (RAM). A checkbox 422 enables the usage level meter 424 when checked and disables it off when de-checked. The buffer usage meter 430 displays a usage level meter 434 for the buffer. A checkbox 432 enables the usage level meter 434 when checked and disables it when de-checked. The import progress meter 440 and export progress meter 450 displays the progress of import and export operations, respectively. The Vid In status display 460 indicates the status of the video input based on the color the label Vid In. The video standard status display 470 indicates the video standard the system is currently set to. The channel drop down menu 480 indicates the channel. Selecting the channel drop down menu 480 indicates the available channels in the system and allows the user to select between them. The Aud In status 490 indicates the status of the audio input based on the color the label Aud In. The Ref In status display 492 indicates the status of the timing reference input based on the color the label Ref In. The disk status display 494 indicates the status of the disk throughput based on the color the label disk.

Figure 5:
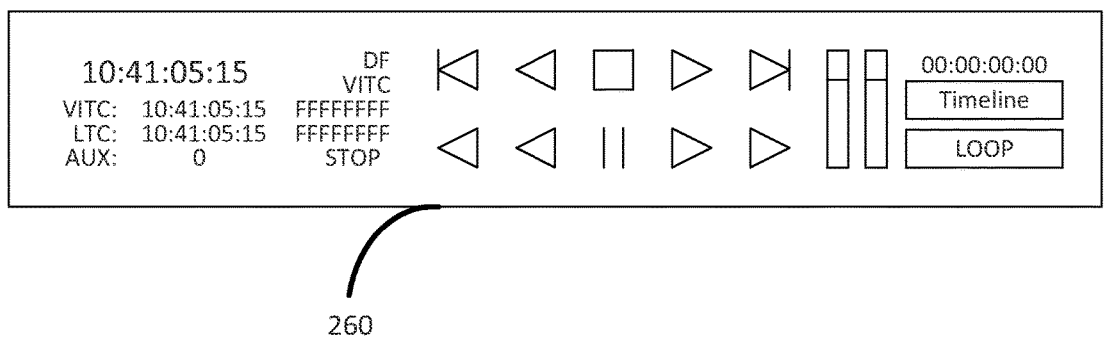
FIG. 5 illustrates an exemplary transport control.

Referring to FIG. 5, the transport controls 260 may include a variety of different features to control the presentation of the video, such as play, stop, pause, fast forward, etc. A multitude of other transport related items may be included, such as for example, auxiliary information associated with the video, LTC information, VITC information, current time code information, video display information (NTSC, PAL, etc.), control types, 5 second reverse selection, 1 frame reverse selection, stop selection, 1 frame forward selection, 5 seconds forward selection, audio meter, jog/shuttle controller selection, go to selection, timeline/clip/external mode selections, jog/shuttle controller selection, transport state (play, stop pause, etc.), fast reverse play selection, reverse play selection, pause selection, play selection, fast forward selection, and/or loop selection.

Figure 6:
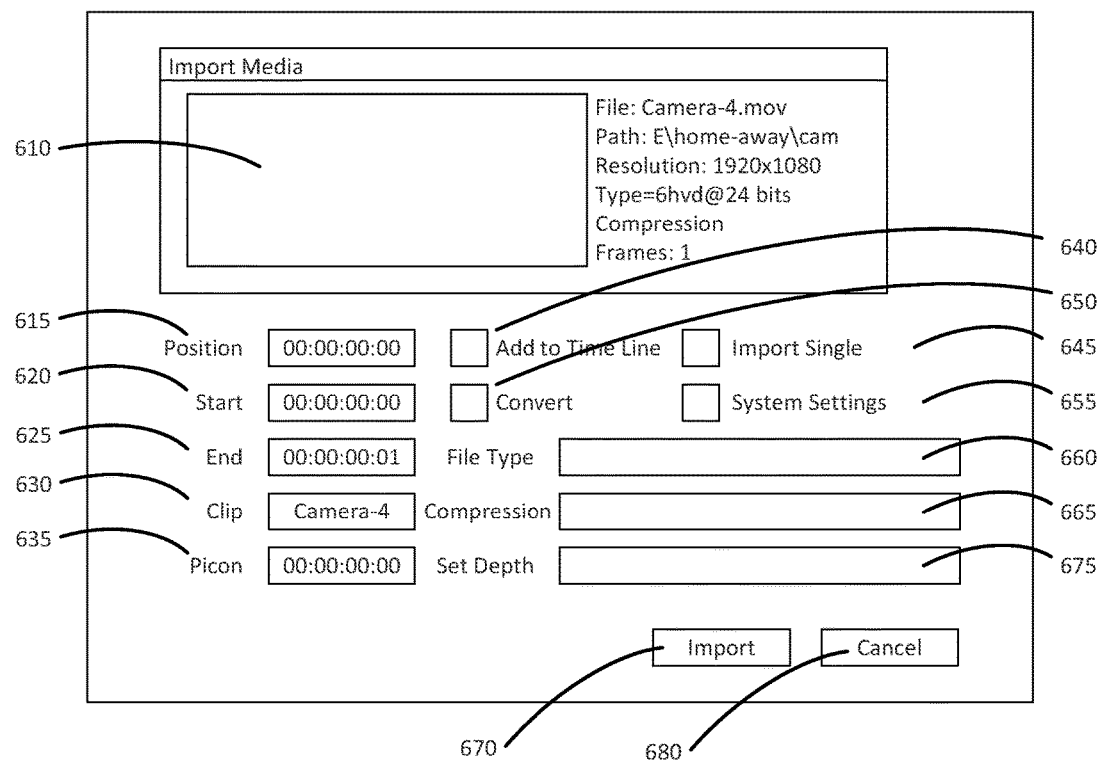
FIG. 6 illustrates an exemplary import interface.

Referring to FIG. 6, an import interface provides a multitude of suitable selections for importing media. The import interface includes a clip details selection 610, a position field selection 615 (active when Add to Time Line checkbox is checked) to select a time code location of where to place the media, a start field selection 620 which trims frames from the start of the import, an end field selection 625 that trims frames from the end of the import, a clip field selection 630 permits the selection to be named, a picon field selection 635 which is a small image of a frame, an add to time line checkbox 640 activates the position field 615 of where the clip is added to the timeline, an import single checkbox 645 imports the selected media as a single frame, a convert media checkbox 650 activates the system settings checkbox 655 and permits the specification of how the media is converted during the import operation, a file type drop down menu 660 selects the type of file to create with the conversion, a compression drop down menu 665 selects the compression for the file, an import selection 670 begins the importing process, a bit depth drop down menu 675 selects the compression for the file type, a cancel selection 680 exports the import interface, and the system settings checkbox 655 becomes active when the convert media checkbox 650 is checked the conversion is done with the same file type, compression, and bit depth the system is currently set to.

Referring to FIG. 7, an export selection from the main menu permits the exporting of the current timeline. The exporting may have several options, such as for example, where to save the file, the type of export data list (EDL) desired (e.g., CMX, Grass Valley, Sony, Avid, Final Cut Pro, Flex), the file type, the compression setting, the bit depth, the range to be exported, and/or the translation desired. A new profile may be created, such as MediaReactor Profile window. The profile includes a description, a file type, a codec selection, a width of frame, a height of frame, a bit depth of video, a data rate of video, a key frame of video, a quality of video, and audio settings such as separate audio track from the video option, audio only option, dual mono option, sample rate, bits/sample, quality, audio filter settings, and blend fields.

Figure 8:
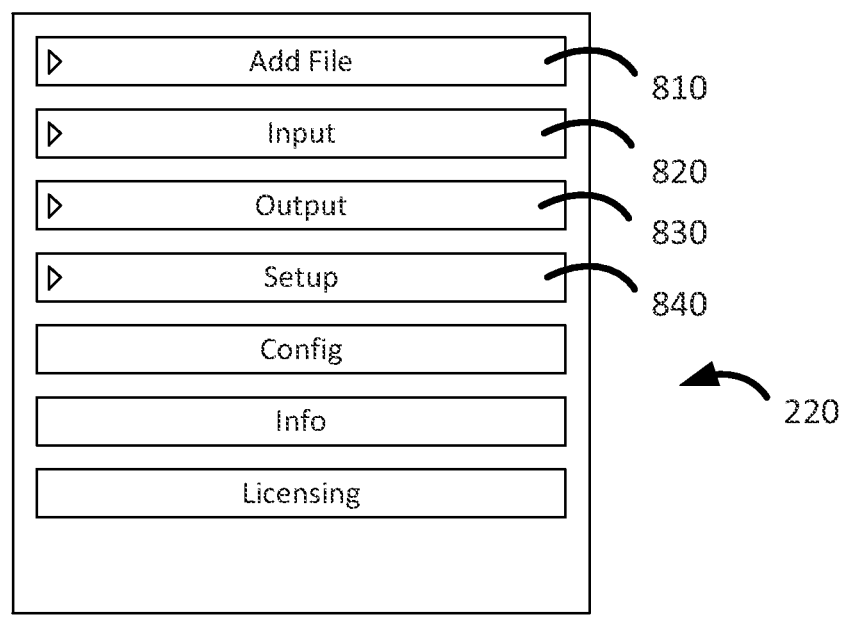
FIG. 8 illustrates an exemplary operations menu.

Referring to FIG. 8, the operation menu 220 may include a variety of options. One of the options may include Add File selection 810 which opens a browser so that the user can search for a file to add to the Import Media menu, and thus added to the clip list and timeline. Another set of options may include an input selection set of options 820, output selection set of options 830, and a setup selection 840.

Figure 9:
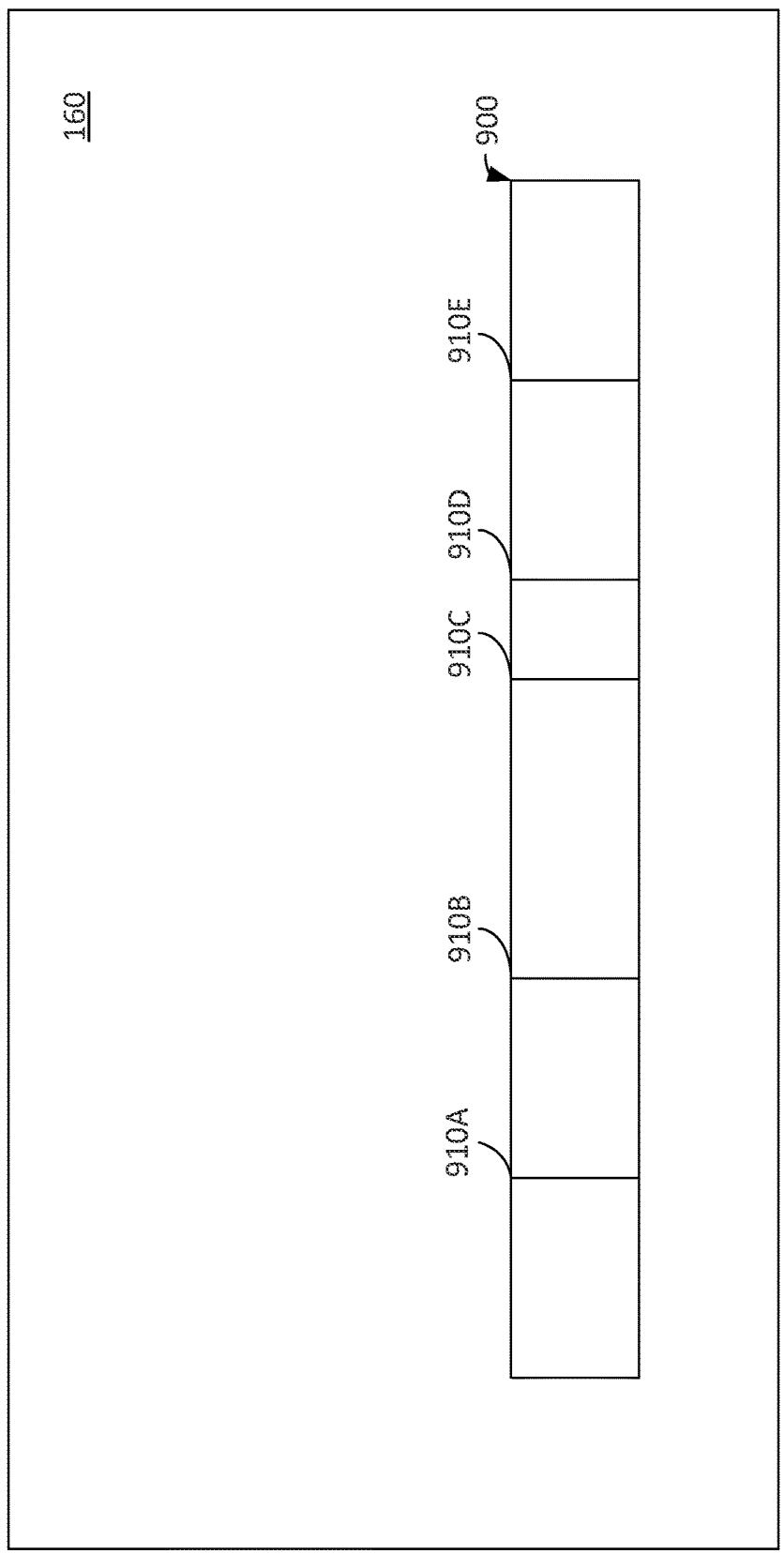
FIG. 9 illustrates an exemplary representation of a temporal video timeline with key frames.

Referring to FIG. 9, a video may be represented by a temporal timeline 900 displayed in the user interface 160. Within the timeline 900, a series of key frames 910A-910E may be identified on the timeline 900. At each of the key frames 910, the system may associate a set of control parameters that are provided to the conversion system 130. The control parameters are maintained by the conversion system 130 and applied to each frame of the subsequent video until subsequently modified by the system 110, which is typically at the next subsequent key frame. In some cases, the control parameters may be applied to previous frame, if desired. In some cases, the control parameters are only applied for a limited duration or number of frames. In this manner, the conversion system 130 converts the two dimensional image content into three dimensional image content, where the system 110 provides control parameters to modify the parameters of the conversion system 130. In some cases, the control parameters for a set of frames may be provided together with a key frame at the start of the set of frames. The control parameters may be provided as a separate data stream (such as in XML format), a data stream provided together with the set of frames of the video (such as an auxiliary stream), and/or imbedded in the video frames itself such as control parameters encoded within the pixels of the last line of each key frame. With this technique for the characterization of the video content, in a segment by segment manner, sufficient control for an efficient 2D to 3D conversion process is enabled.

Figure 10:
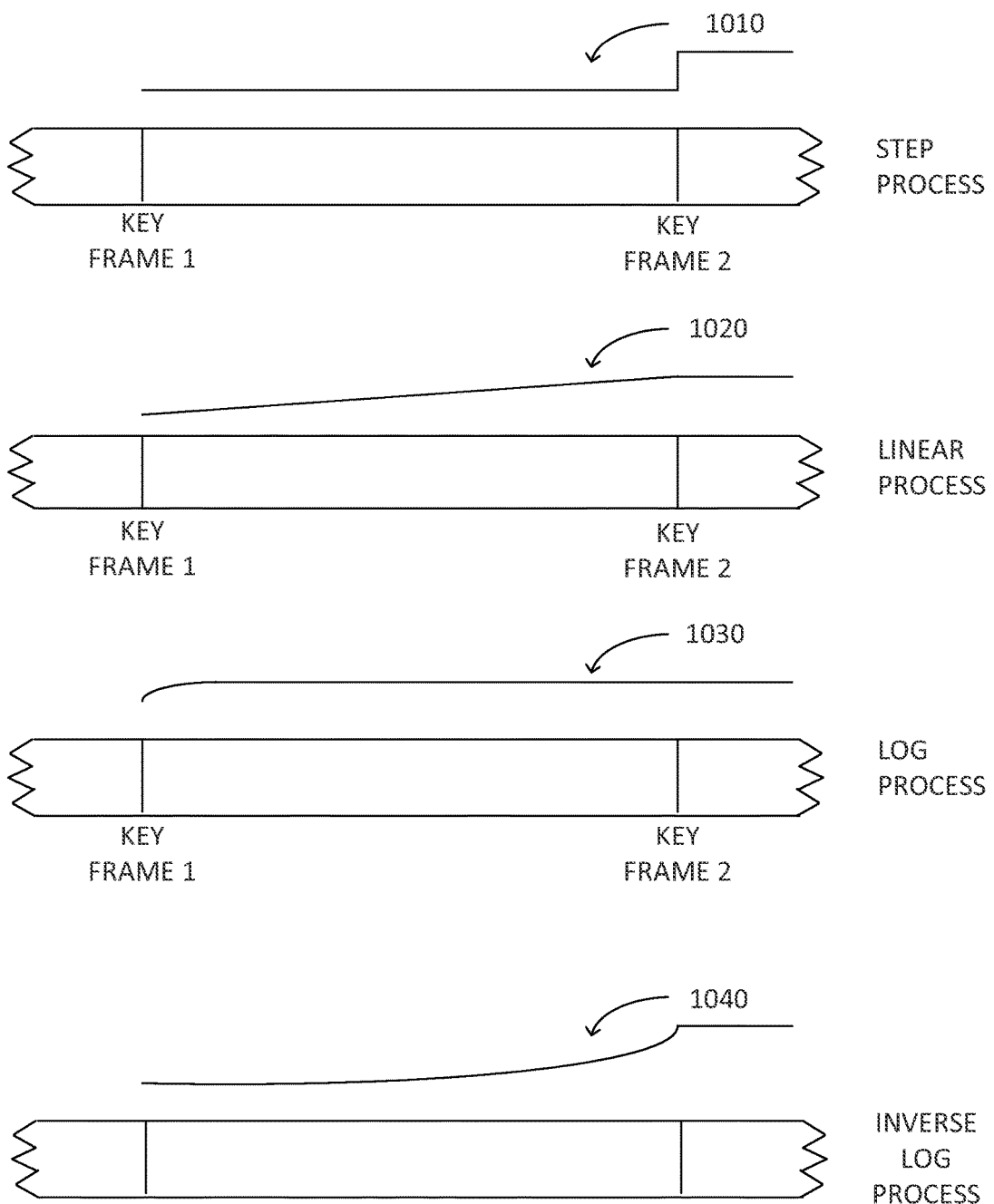
FIG. 10 illustrates exemplary automatic generation of varying the depth map and/or rendering process.

Referring to FIG. 10, it may be desirable to automatically vary the depth map and/or rendering process between adjacent key frames in some defined manner so that the user does not have to manually adjust such control parameters in a manual manner, which tends to be time consuming. One technique for such automatically varying the depth map and/or rendering process is using a step process 1010. Another technique for such automatically varying the depth map and/or rendering process is using a linear process 1020. Another technique for such automatically varying the depth map and/or rendering process is using a log process 1030. Another technique for such automatically varying the depth map and/or rendering process is using an inverse log process 1040. In general, any suitable function may be used to automatically varying the depth map and/or rendering process between adjacent key frames. Also, the suitable function may be used to automatically vary the depth map and/or rendering process between any pair of frames of the video.

Figure 11:
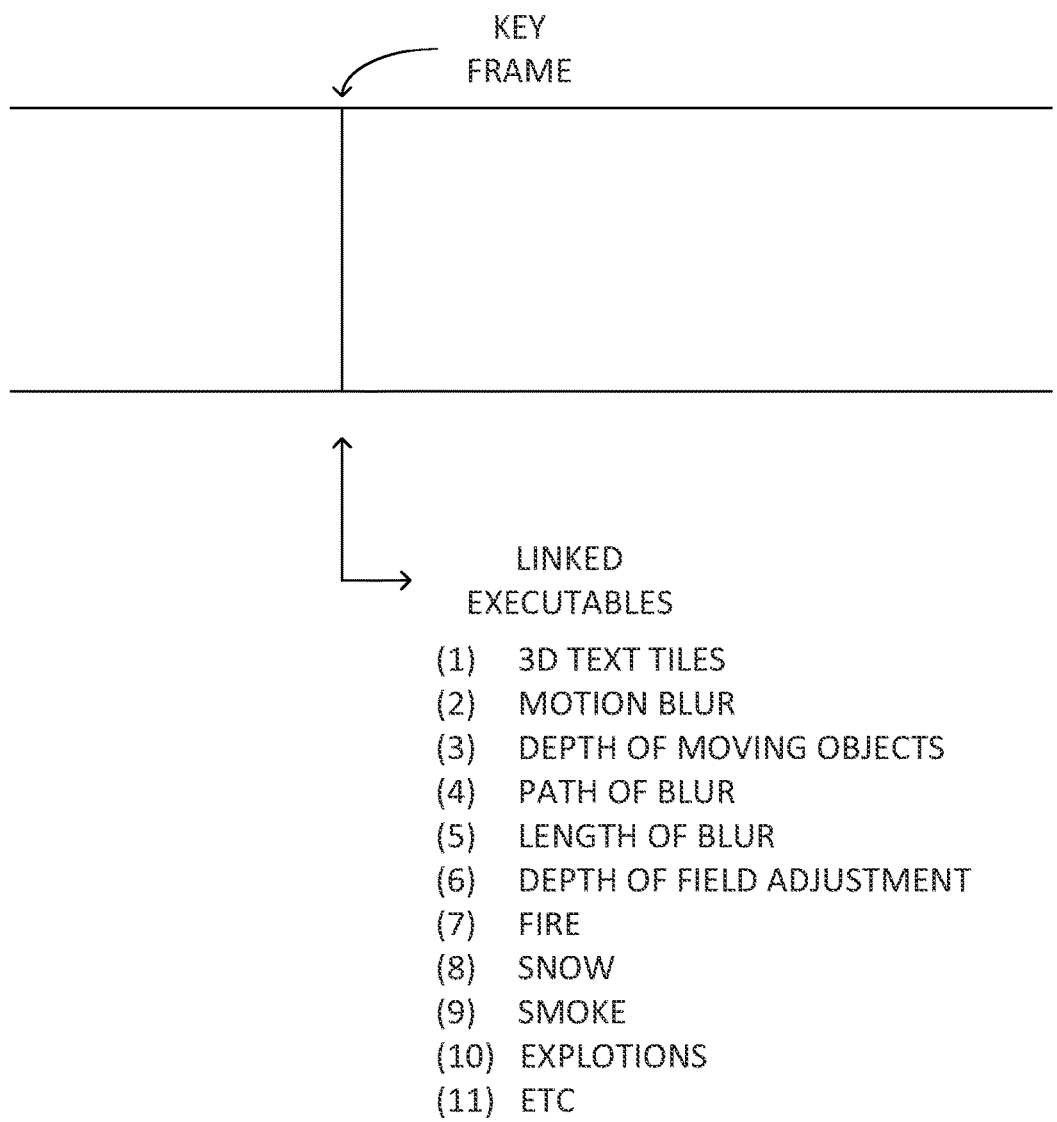
FIG. 11 illustrates an exemplary set of linked executable processes associated with a key frame.

Referring to FIG. 11, in addition to providing control parameters associated with key frames to the 2D to 3D conversion process 130, the system may also include specialized functionality associated with the key frames. The specialized functionality may include one or more executable functions associated with one or more key frames. The executable function may include, for example, three dimensional text titles, motion blur, depth of moving objects, path of blur, length of blur, depth of field adjustment, fire, snow, smoke, explosions, etc. These executable functions, if desired, may be dependent on the temporal spacing between adjacent key frames and/or the number of frames between adjacent key frames. In this manner, the executable functions are modified in accordance with the key frame information. Further, the executable functions may be dependent on the three dimensional content of the video content. By way of example, a fire may be included in the converted video content by the 2D to 3D video converter together with the length of the fire being determined based upon the temporal duration of the clip and/or and the fire is spatially included within the clip based upon the three dimensional characteristics. Also, the specialized functionality may be associated with any one or more frames of the video. Also, the specialized functionality may be associated with one or more clips of the video between any suitable frames.

Figure 12A:
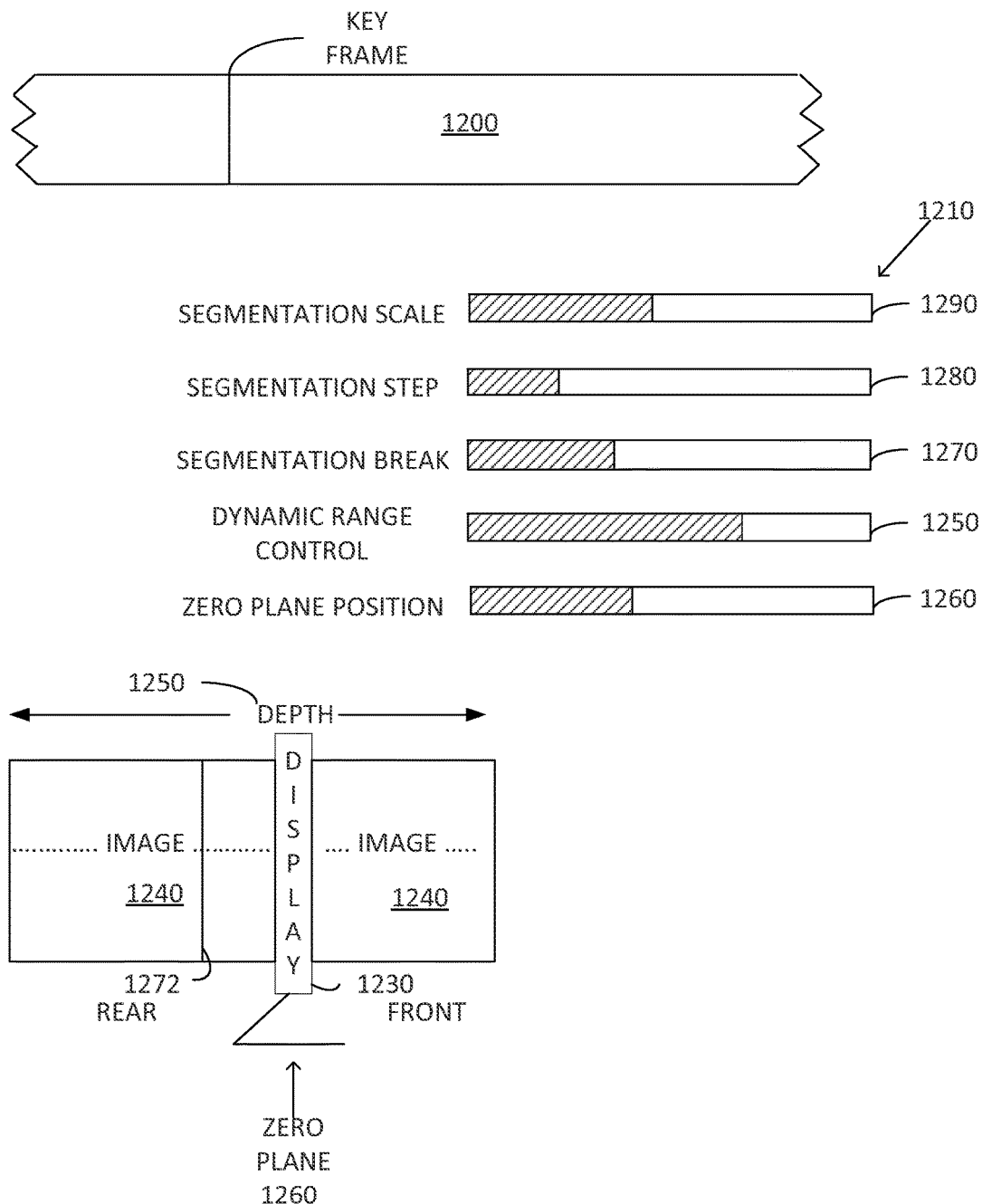
FIGS. 12A-12D illustrates exemplary three dimensional controls.

Referring to FIG. 12A, a timeline 1200 may include three dimensional controls 1210. One of the three dimensional controls 1210 may include a dynamic range control 1220. The dynamic range control 1220 selects the overall depth volume of the three dimensional environment. For example, a shallow dynamic range limits the 3D range to render relatively small 3D effects. For example, a deep dynamic range expands the 3D range to include the capability of rendering relatively large 3D effects. This dynamic range may be visualized as the potential three dimensional depth 1250 of an image 1240 behind and/or in front of the display 1230.

Another of the three dimensional controls 1210 may include a zero plane position 1260. The zero plane position 1260 may be considered to be the position of the image 1240 that is aligned with the display screen 1230. For example, a small zero plane value would tend to render most of the images 1240 to appear as being to the rear of the display 1230. For example, a large zero plane value would tend to render most of the images 1240 to appear as being in the front of the display 1230. Typically, the zero plane is selected to be at the two dimensional focus of the image content. The zero plane position 1260 may likewise be used to render a substantial portion of the image content in front of the display 1230 which provides a "pop out" of the image content.

Another of the three dimensional controls 1210 may include a segmentation break 1270 which defines a depth position 1272 in the three dimensional image space. The depth position 1272 may be considered another depth plane. Around this depth position 1272 other effects may be efficiently made on the image content. For example, the depth position 1272 may be positioned in a region behind foreground images and in front of the background image. Further, a plurality of depth positions 1272 may be selected, if desired. Further, the depth position 1272 may be a range of depths, with the effects occurring on either side of the range of depths. In this manner, a range of depths may remain unchanged with effects occurring on either side of the range of depths. In addition, the effects may extend the entire range from the depth position 1272 in one or both directions and/or may extend a limited range from the depth position 172 in one or both directions (such as to one or more "stop positions").

Figure 12B:
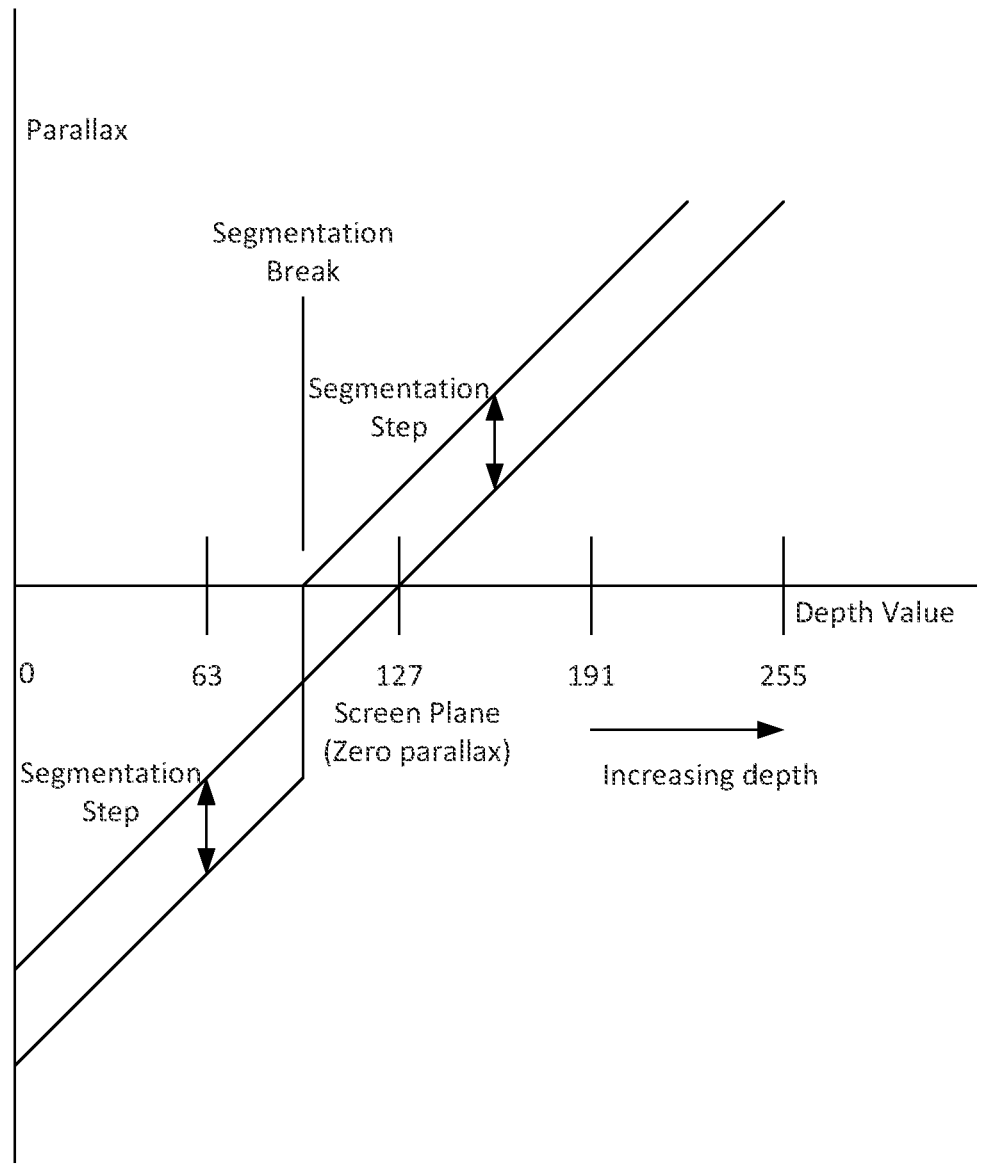

Referring also to FIG. 12B, another of the three dimensional controls 1210 may include a segmentation step 1280 which operates in conjunction with the segmentation break 1270. The segmentation step 1280 operates to move the three dimensional content away from the segmentation break 1270. In this manner, by increasing the segmentation step 1280, the user may selectively move objects away from the segmentation break 1270. For example, with the segmentation break 1270 positioned in a region behind foreground images and in front of the background image, the foreground images may be brought forward while the background image may be moved backwards by adjusting the segmentation step 1280. If desired, a first segmentation step may operate in a forward direction relative to the segmentation break 1270 and a second segmentation step may operate in a backwards direction relative to the segmentation break 1270. In this manner, the user may selectively move the background backwards and selectively move the foreground forward by different amounts, including zero. In addition, the segmentation step may be applied between one or more segmentation breaks, if there are multiple segmentation breaks for a particular key frame. Further, the segmentation break 1270 may be a range of depths, with the effects occurring on either side of the range of depths. In this manner, a range of depths may remain unchanged with effects occurring on either side of the range of depths. In addition, the effects may extend the entire range from the segmentation break 1270 in one or both directions and/or may extend a limited range from the segmentation break 1270 in one or both directions (such as to one or more "stop positions").

Figure 12C:
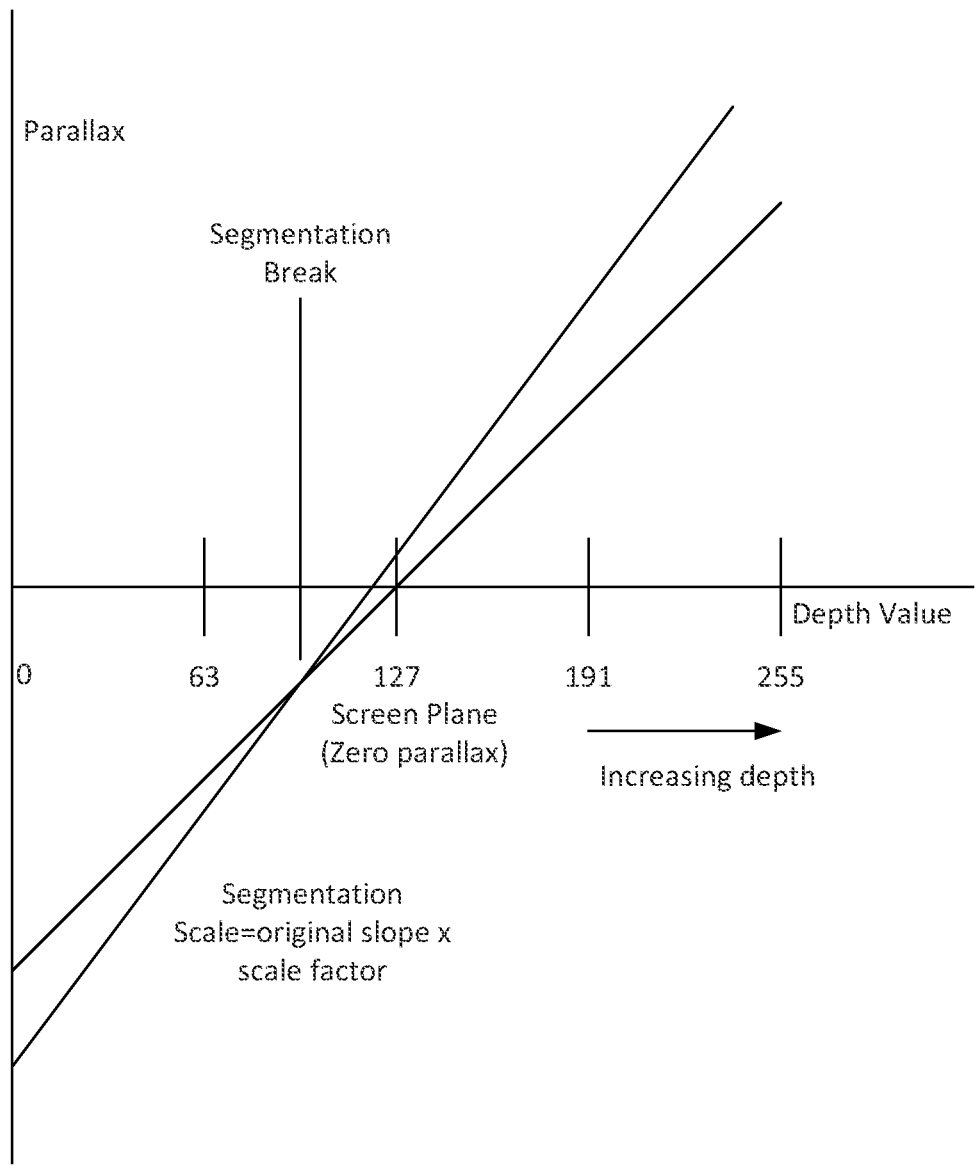

Referring also to FIG. 12C, another of the three dimensional controls 1210 may include a segmentation scale 1290 which operates in conjunction with the segmentation break 1270. The segmentation scale 1290 operates to stretch the three dimensional content away from the segmentation break 1270 toward the front. In this manner, by increasing the segmentation scale 1290, the user may selectively stretch objects away from the segmentation break 1270 toward the front. For example, with the segmentation break 1270 positioned in a region behind foreground images and in front of the background image, the foreground images may be stretched forward while the background image remains stationary by adjusting the segmentation stretch 1290. If desired, a first segmentation scale may operate in a forward direction relative to the segmentation break 1270 and a second segmentation scale may operate in a backwards direction relative to the segmentation break 1270. In this manner, the user may selectively stretch the background backwards and selectively stretch the foreground forward by different amounts, including zero. In addition, the segmentation scale may be applied between one or more segmentation breaks, if there are multiple segmentation breaks for a particular key frame.

Figure 12D:
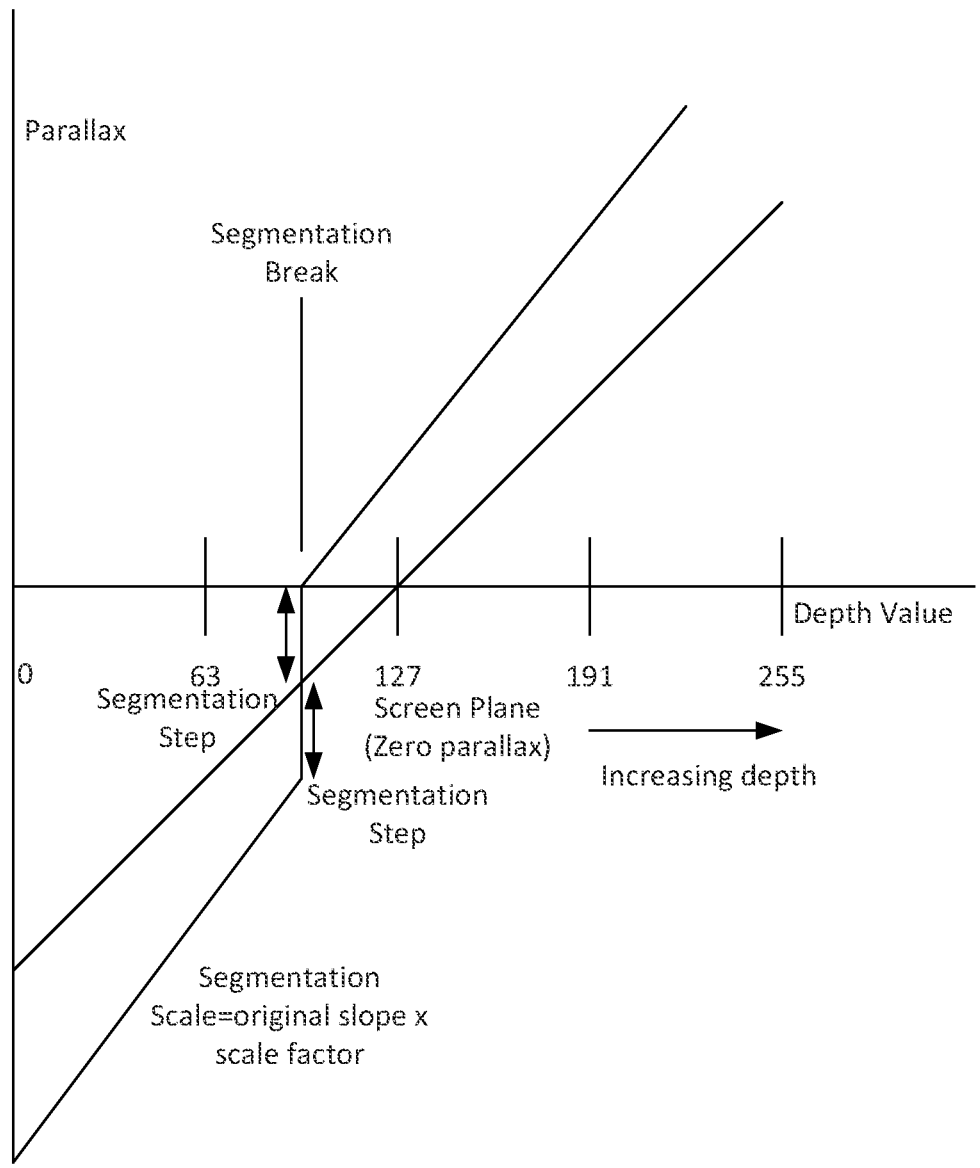

Referring to FIG. 12D, the segmentation step may operate in combination with the segmentation scale relative to the segmentation break. Also, the segmentation step and segmentation scale may be applied between one or more segmentation breaks.

Figure 13:
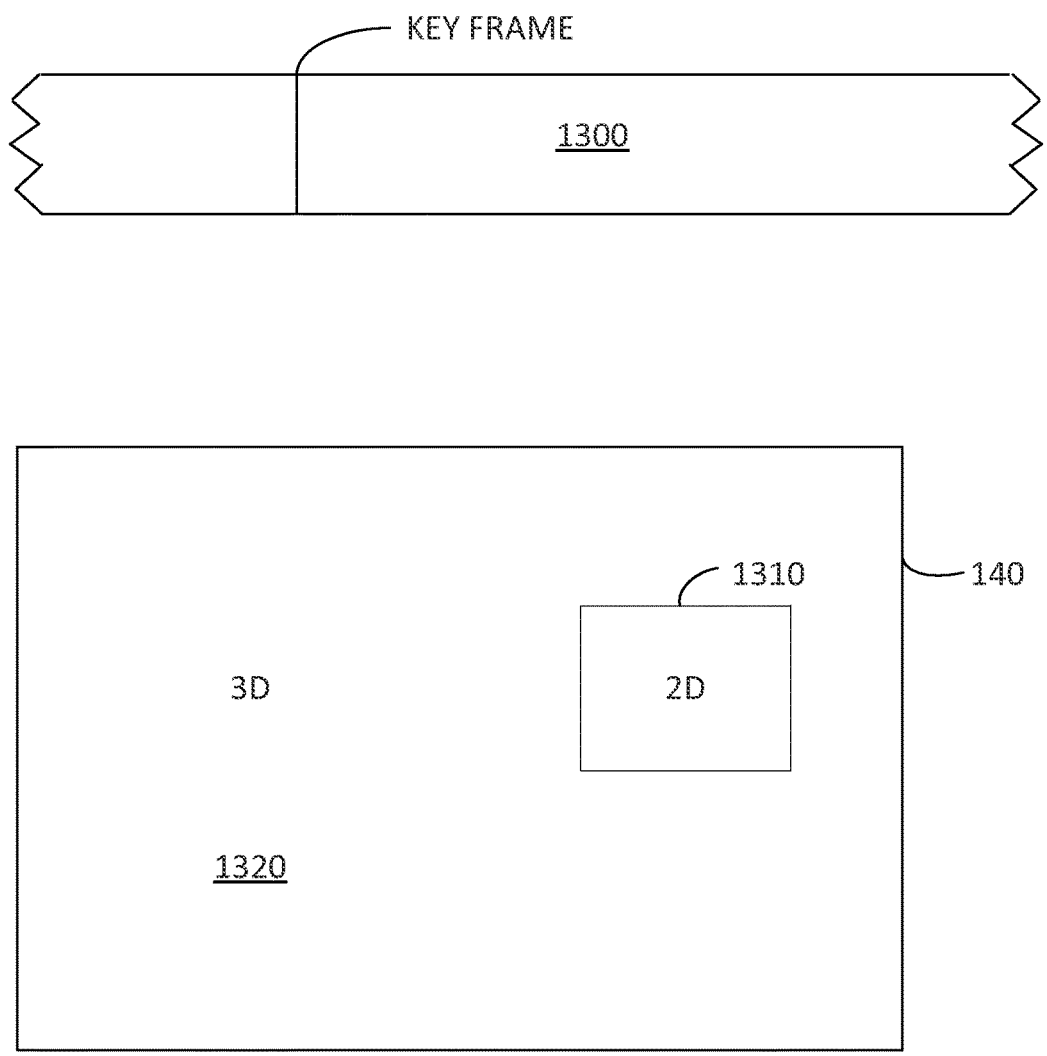
FIG. 13 illustrates an exemplary display with 2D and 3D regions.

Referring to FIG. 13, one of the three dimensional controls may include two dimensional (2D) and three dimensional (3D) spatial segmentation. Portions of the image content 1310 displayed on the three dimensional display 140, such as words and tiling, are preferably presented to a user as two dimensional content. Other portions of the image content 1320, such as city scenes, are preferably presented to a user as three dimensional content. Accordingly, it is desirable to include a spatial selector to define a spatial region 1310 of the image as being desirable to be rendered as two dimensional content and another spatial region 1320 as being desirable to be rendered as three dimensional content.

Figure 14:
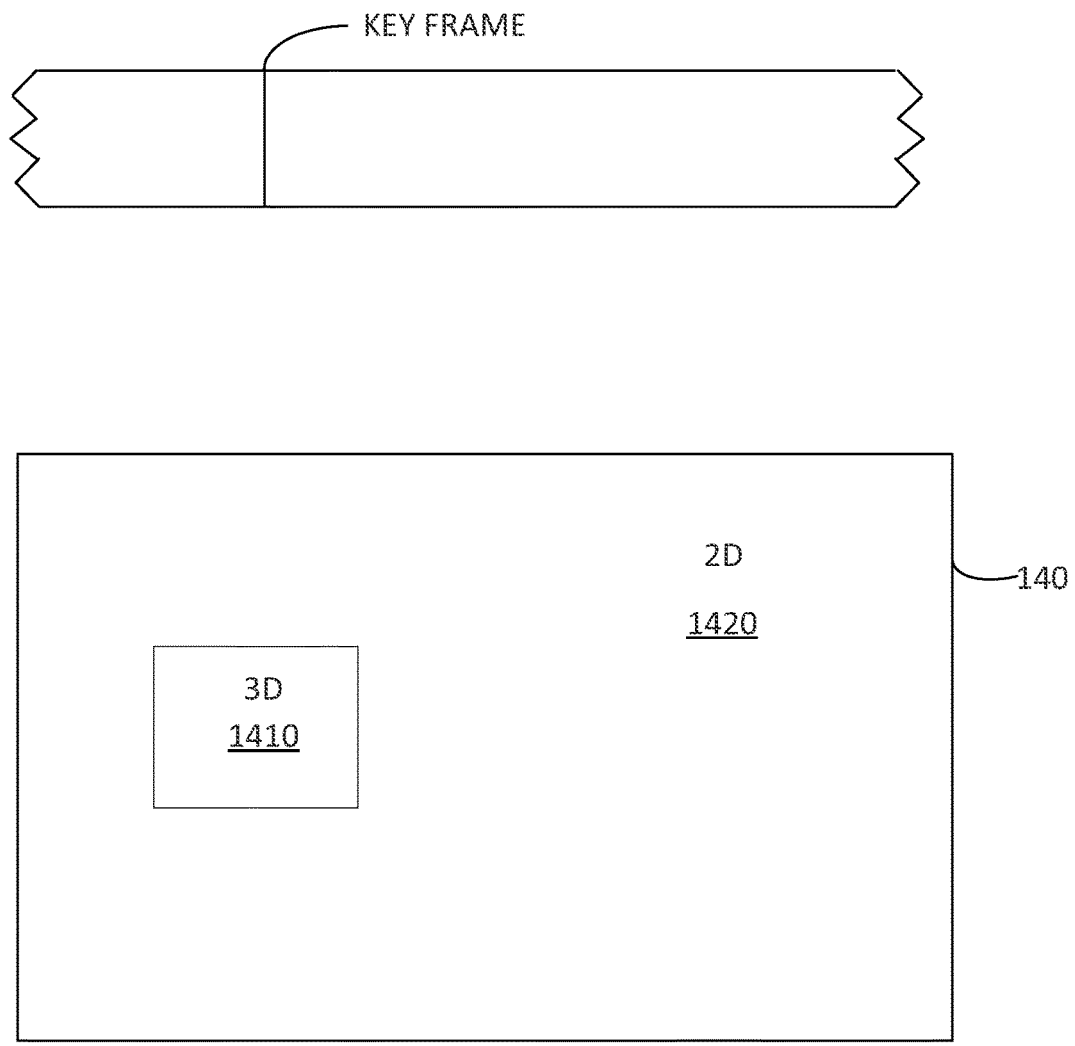
FIG. 14 illustrates an exemplary display with 2D and 3D regions.

Referring to FIG. 14, another of the three dimensional controls may include segmentation of portions of the image content 1420 displayed on the three dimensional display 140, such as words and tiling, being preferably presented to a user as two dimensional content. Other portions of the image content 1410, such as city scenes, are preferably presented to a user as three dimensional content. Accordingly, it is desirable to include a spatial selector to define a spatial region 1410 of the image as being desirable to be rendered as three dimensional content and another spatial region 1420 as being desirable to be rendered as two dimensional content.

Figure 15:
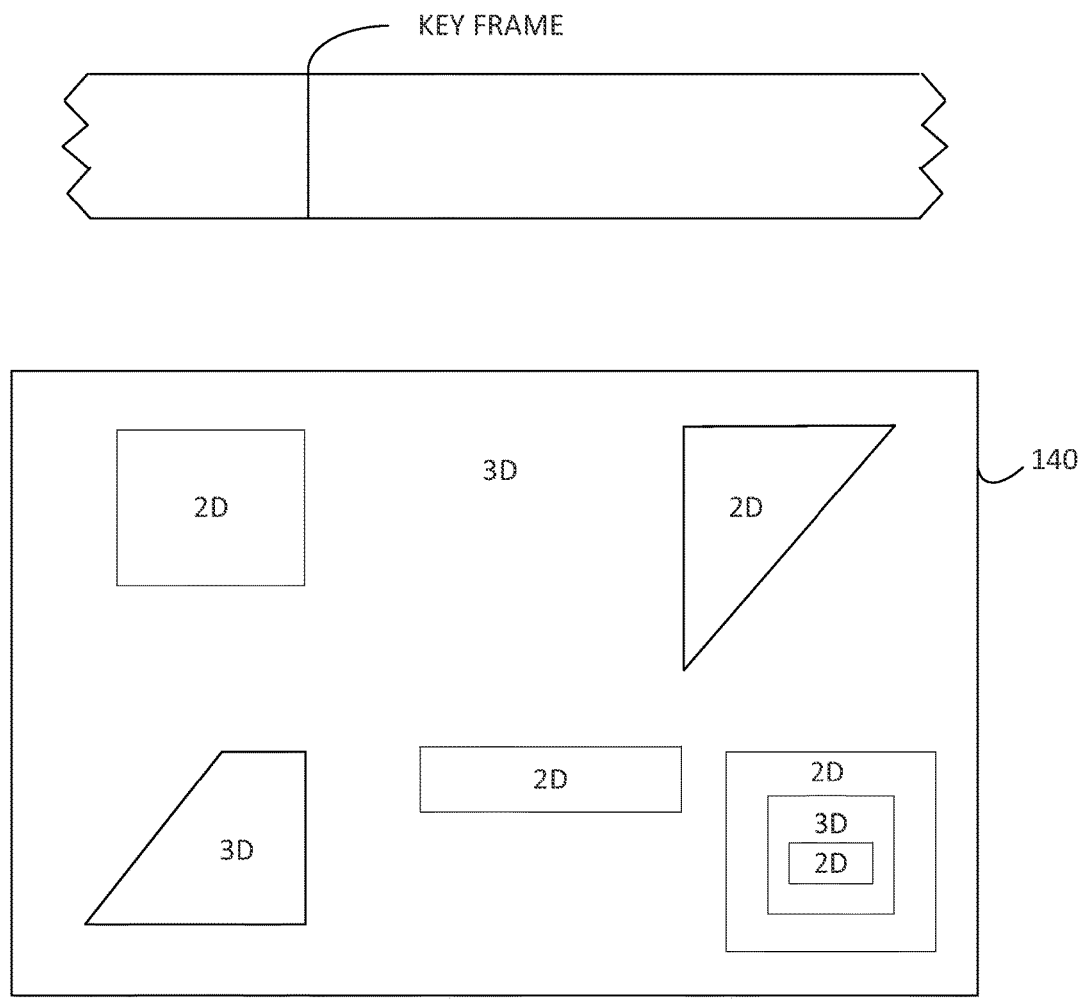
FIG. 15 illustrates an exemplary display with 2D and 3D regions.

Referring to FIG. 15, another of the three dimensional controls may include segmentation of one or more portions of the image content displayed on a three display are preferably presented to a user as two dimensional content and one or more other portions of the image content preferably presented to the user as three dimensional content. The background portions of the image content may be selectively set to be displayed as either two dimensional content or three dimensional content.

Referring to FIG. 16, one of the three dimensional controls may include one or more two dimensional (2D) spatial segmentations and one or more three dimensional (3D) spatial segmentations that includes a portion of the three dimensional depth. Portions of the image content 1610 defined within the three dimensional bounding box displayed on the three dimensional display 140 are preferably presented to a user as two dimensional content. Other image content that is forward and/or rearward to the bounding box 1610 are displayed as three dimensional content. Other portions of the image content 1620 defined with the three dimensional bounding box displayed on the three dimensional display 140 are preferably presented to a user as three dimensional content. Other image content that is forward and/or rearward to the bounding box 1620 are displayed as two dimensional content. Accordingly, it is desirable to include a spatial selector with depth controls to define one or more spatial regions to be rendered as two dimensional content and one or more spatial regions to be rendered as three dimensional content. The non-selected regions of the image may be two dimensional or three dimensional, as desired.

Figure 17:
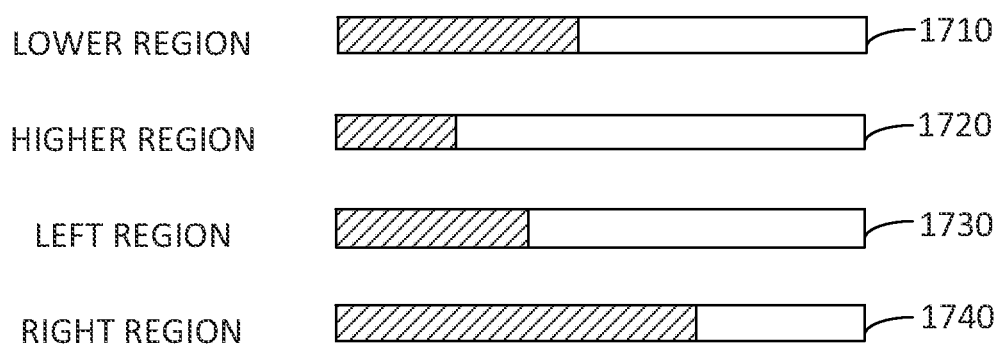
FIG. 17 illustrates exemplary sliders to modify the 3D effects of the image.

Referring to FIG. 17, it is desirable to modify the 3D effects by modifying one region of the image relative to others. A slider 1710 may be used to increase the 3D depth effects at the lower region of the display relative to the higher region of the display. A slider 1720 may be used to increase the 3D depth effects at the higher region of the display relative to the lower region of the display. A slider 1730 may be used to increase the 3D depth effects at the left region of the display relative to the right region of the display. A slider 1740 may be used to increase the 3D depth effects at the right region of the display relative to the left region of the display. In addition, others sliders may also effectively tilt the 3D plane in any desirable direction. Further, the tilting of the 3D plane may be non-linear, as desired.

Referring to FIG. 18, there may be a variety of different control codes provided between the computer system and the 2D to 3D conversion system that provide modification of the conversion process from 2D to 3D. For example, one bit may be used to select the eye swapping 1800, with a default of 0 for no swapping. For example, one bit may be used for a background tilt 1802, with a default of 1 for background tilt enabled. For example, 4 bits may be used for a depth map estimating technique 1804, with a default of 0000 for the default technique. For example, 3 bits may be used for a segmentation technique 1806, with a default of 000 for the step technique. For example, 1 bit may be used for a control code location within the image frame 1808, with a default of 0 for inside the visible screen portion of the image. For example, 1 bit may be used for a 3D conversion 1810, with a default of 1 for enable conversion. For example, 3 bits may be used for a segmentation scale value 1812, with a default of 000 of a scale factor of 1.0. For example, 8 bits may be used for a zero plane position 1814, with a default of 60. For example, 6 bits may be used for a dynamic range adjustment 1816, with a default of 10. For example, 8 bits may be used for a segmentation breakpoint 1818, with a default of 00. For example, 5 bits may be used for a segmentation step size 1820, with a default of 00. For example, 3 bits may be used for a control code hiding technique, with a default of 001.

Even with advanced 2D to 3D conversion techniques, the determination of the three dimensional image content tends to have some aspects of the image located at an undesirable depth within the image. For example, one undesirable effect may be depth spiking, usually toward the viewer, which is the result of the depth techniques trying to resolve a location when there is a significant visual feature intensity with high brightness and/or high saturation that is dramatically different than the surrounding background. For example, the three dimensional location of a table lamp that should be positioned on a table may be inappropriately located at a location behind the table. While such a misplaced locations may be readily apparent to the user, it is desirable to include tools accessible from the interface to effectively select objects in some manner so that those objects may be relocated as a more appropriate image depth.

Figure 19:
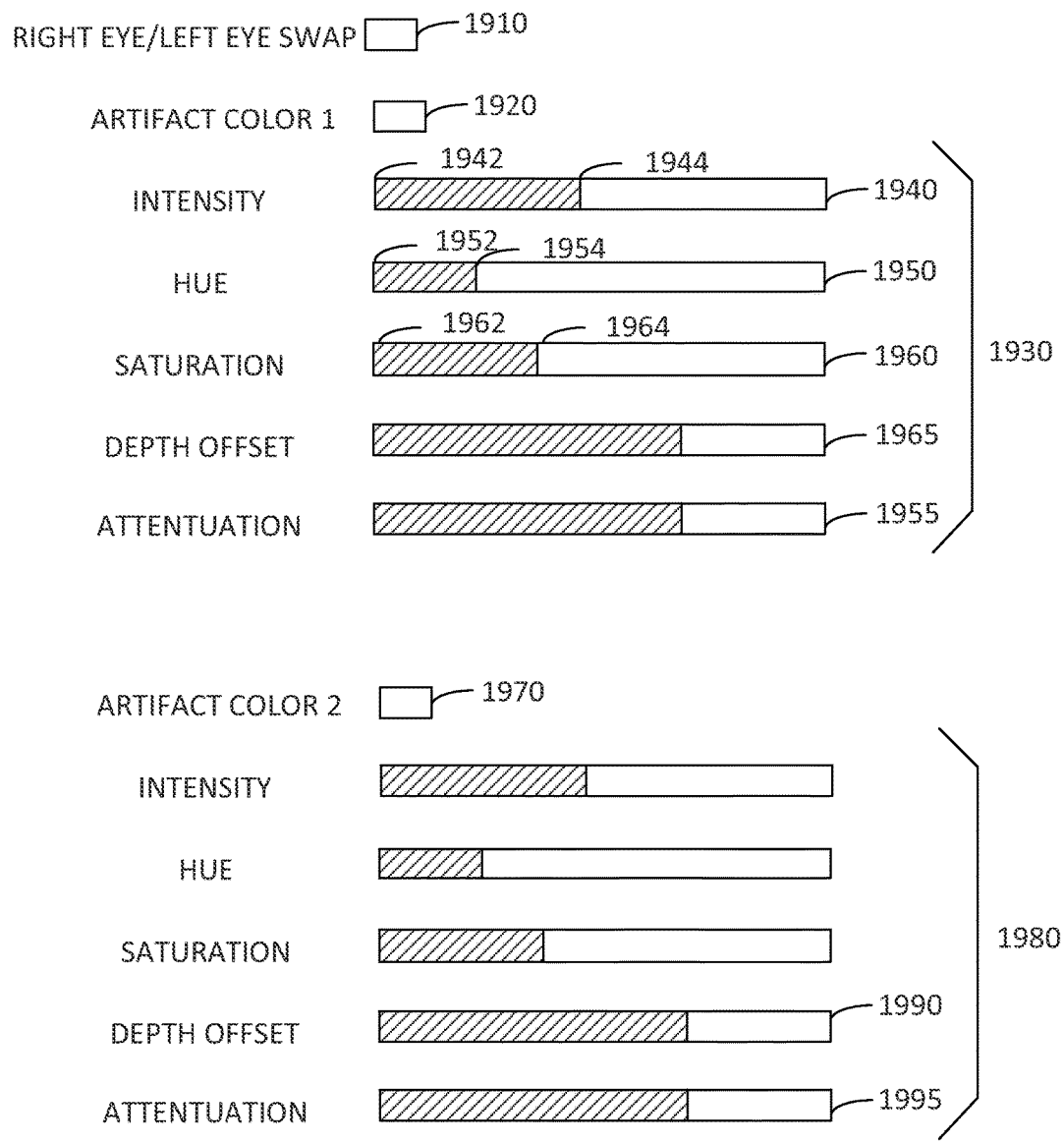
FIG. 19 illustrates an exemplary artifact suppression interface.

Referring to FIG. 19, an artifact suppression feature may be selected for an associated key frame (or any suitable frame(s) of the video) to assist with the depth estimation by selecting a significant visual feature in the interface window. After the significant visual feature is selected the depth engine of the 2D to 3D conversion process is modified as a result so that generally the selected significant visual feature has a modified depth in the image. The modified 2D to 3D conversion process may be maintained from a selected key frame until a subsequent key frame. In some embodiments, the modified 2D to 3D conversion process may be maintained for a plurality of frames of the video, from a first frame to an end frame. In some embodiments, the modified 2D to 3D conversion process may be maintained until turned off, and thus remains active for the remaining video sequence.

The artifact suppression feature may include a right eye/left eye swap feature 1910 where the image presented to the eyes are switched. This tends to be useful when the video scene is back lighted which can cause the depth map to invert to some extent. If this is the case, this swapping of the eyes is readily performed in an efficient manner and may result in a sufficiently high 3D image quality.

The artifact suppression feature may include an artifact color 1 selection 1920, which enables a first set of selectors 1930. The first selector 1930 includes an intensity selector 1940. The intensity selector 1940 may select a range of intensities within the image, from a lower value 1942 to a higher value 1944. In this manner, those pixels (or groups of pixels) within the image that contain values within the range of intensity values are selected. In addition, those pixels that are selected may be highlighted in some manner on the display so that they can be readily identified. Accordingly, if it is desirable to select a bright object, a bright intensity range may be selected that corresponds with the object of interest and adjusted until the object of interest is sufficiently discriminated from the non-objects of interest in the image.

The first selector 1930 includes a hue selector 1950. The hue selector 1950 may select a range of within the image, from a lower value 1952 to a higher value 1954. In this manner, those pixels (or groups of pixels) within the image that contain values within the range of hue values are selected. In addition, those pixels that are selected may be highlighted in some manner on the display so that they can be readily identified. Accordingly, if it is desirable to select an object with a particular range of hues, a hue range may be selected that corresponds with the object of interest and adjusted until the object of interest is sufficiently discriminated from the non-objects of interest in the image.

The first selector 1930 includes a saturation selector 1960. The saturation selector 1960 may select a range of within the image, from a lower value 1962 to a higher value 1964. In this manner, those pixels (or groups of pixels) within the image that contain values within the range of saturation values are selected. In addition, those pixels that are selected may be highlighted in some manner on the display so that they can be readily identified. Accordingly, if it is desirable to select an object with a particular range of saturation, a saturation range may be selected that corresponds with the object of interest and adjusted until the object of interest is sufficiently discriminated from the non-objects of interest in the image.

A depth offset 1965 may be used to select the offset of the selected region of the image, such as offset toward the rear or an offset toward the front. Other selectors may be used, as desired, to further discriminate aspects of the image. The combination of the selectors 1940, 1950, 1960 may be used in combination with one another to provide object discrimination.

An attention selector 1955 may be used to select the attenuation of the selection region of the image, such as an attention toward the rear or an attention toward the front. The attention in effect modifies the 2D to 3D conversion process for the identified image characteristics, such as a modification of the depth map and/or a modification of the generation process, to select how much of the selected image characteristics is changed in depth. In this manner, the effect may be subtle to move the depth of the image characteristics in a manner this is more visually pleasing than simply reassigning the absolute depth of such image characteristics.

Figure 20:
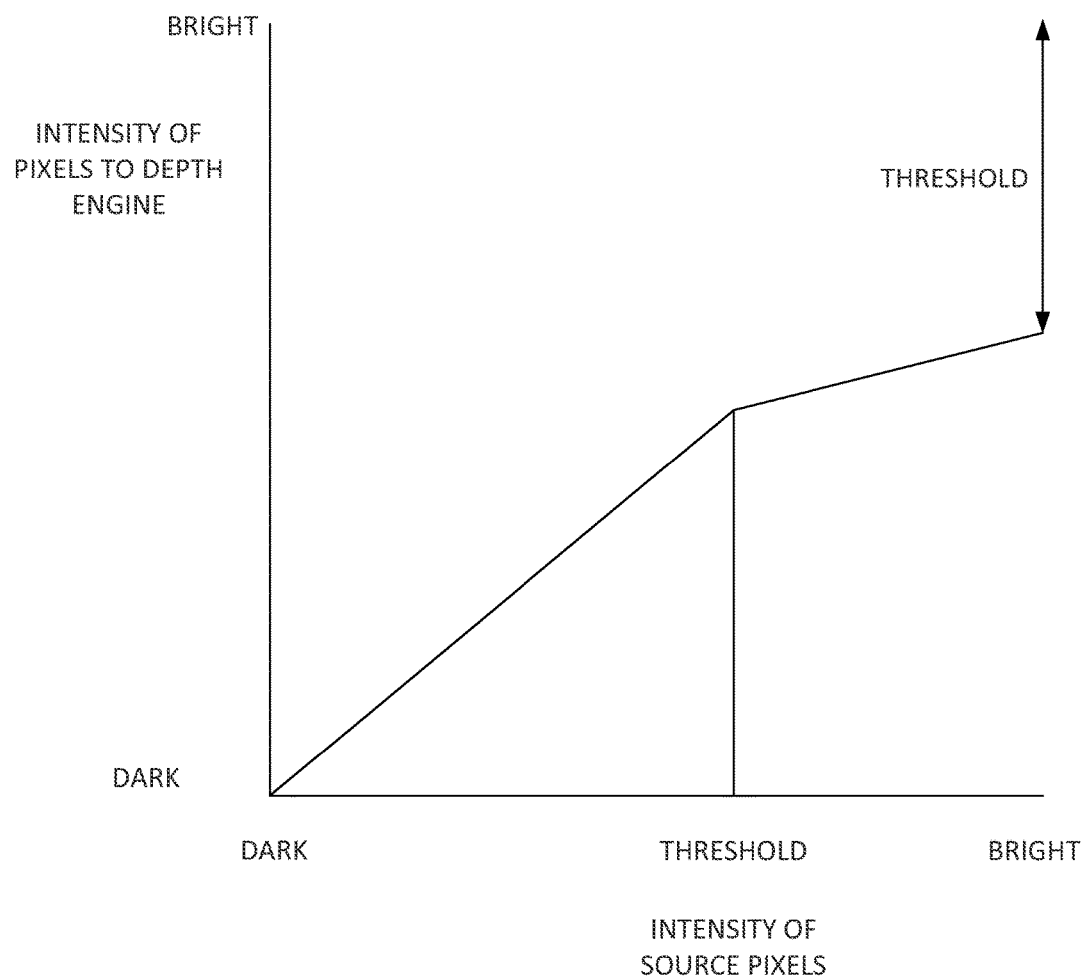
FIG. 20 illustrates an exemplary an attenuation technique for image content.

Referring to FIG. 20, the attention may be a non-linear process, if desired. The selected attenuation modifies the mapping of the intensity of the source pixels to the intensity of pixels to the depth engine of the 2D to 3D conversion process. By way of example, a portion of the mapping may be a pair of substantially linear processes. The threshold may be used to control the beginning intensity of source pixels where attention starts to occur, if desired, and the attention selects the amount of intensity attenuation applied to pixels with intensity above the threshold. The intensity of the source pixels may be a combination of luminance and saturation of the pixels, if desired. The intensity of the output may be applied to both the luminance and saturation of a pixel, which is provided to the 2D to 3D conversion process.

In many cases, it is desirable to select a region of the image which enlarges that region of the image so that an eye dropper selector may be used to select samples of that region. The samples of the region (one or more pixels) may be used to provide initial intensity 1940, hue 1950, and/or attenuation 1960 ranges. In this manner, the user may more readily distinguish suitable ranges for the desired image characteristics.

The artifact suppression feature may include an artifact color 2 selection 1970, which enables a second set of selectors 1980, which are similar to the first set of selectors. The artifact color 2 selection 1970 may be used to further refine the selection within the first set of selectors 1930 and/or may be used to select another set of image content in addition to the first set of selectors 1930. Additional artifact color selections may be included, as desired. A depth offset 1990 may be used to select the offset of the selected region of the image as a result of the artifact color 2 1970 selector, such as offset toward the rear or an offset toward the front. Also, an attenuation selector 1995 may likewise be used.

Other controls may be provided for the modification of the 2D to 3D conversion process, such as for example, layers, masks, brushes, curves, and/or levels.

Figure 21:
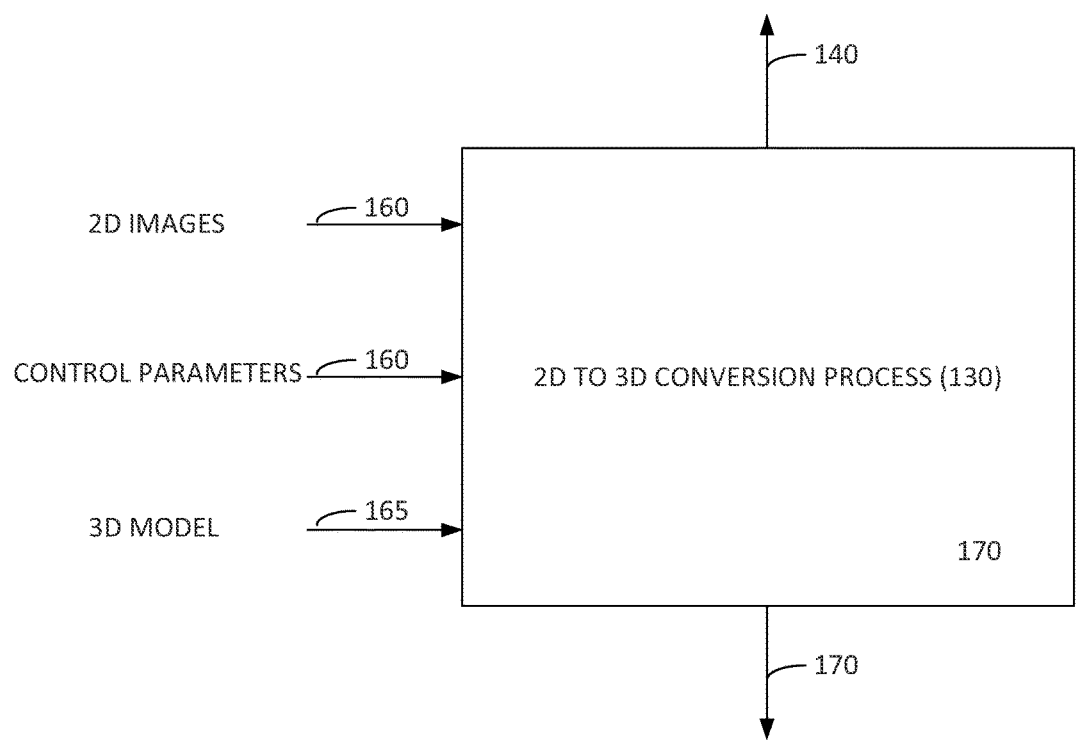
FIG. 21 illustrates an exemplary 2D to 3D conversion process for 2D content and 3D content.

Referring to FIG. 21, the 2D to 3D conversion process 130 may receive the 2D image content and the control parameters 160. Often it is desirable to align the 2D to 3D conversion process of a scene, such as the scene of a flat field terminating with a large cliff, with a 3D model (e.g., a wireframe 3D model) of a vehicle driving in a flat direction and then virtually falling off a cliff. It is difficult to align the falling of the vehicle defined by the 3D model with the 2D to 3D converted image content. To make the alignment of the 3D model with the 2D to 3D conversion it is desirable for the 2D to 3D conversion process 130 to also receive a 3D model 165. Preferably the 2D images are provided together with the 3D model so that both 3D images are rendered together at the same time, preferably in real-time. The 3D model is rendered together with the 2D to 3D conversion process (which may be based upon the control parameters) so that the user may view the interaction of the two distinction 3D image content. If the interaction is not as desired, the 3D model may be modified and/or the 2D to 3D conversion process may be modified, until such interaction is as desired.

In another embodiment, the system may include a plurality of different tracks for the video. For example, the first track may relate to modifications of the video related to depth settings, such as for 2D to 3D conversion. For example, the second track may relate to modifications of the video related to color grading of the video content. If desired, the color gradating may be further dependent on the 2D to 3D conversion. For example, the third track may relate to modifications of the video related to color perception of the video content. If desired, the color perception may be further dependent on the 2D to 3D conversion process. For example, the fourth track may relate to modifications associated with the video content synthesizing smell. If desired, the synthesized smell may be further dependent on the 2D to 3D conversion process. For example, the fifth track may relate to modifications of the video related to a fourth dimension related to the video content, such as movement of a chair in which a viewer would be sitting in. If desired, the fourth dimension may be further dependent on the 2D to 3D conversion process.

If desired, the control codes may be in the form of an event list associated with one or more tracks. Each of the events may be associated with a particular location of the timeline, such that upon reaching that location during viewing of the video the event that is indicated is undertaken. For example, some events may include reading control parameters for the 2D to 3D conversion process, some events may include processing executable processes, some events may identify one or more keyframes, etc.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for creating a three dimensional image using a processor comprising:
    (a) receiving a digital two dimensional input image;
    (b) said processor processing said two dimensional input image to determine a depth map further based upon receiving input from a user interface, where said input from said user interface defines at least one first region of said two dimensional input image that is to be rendered as a two dimensional region;
    (c) said processor generating a three dimensional image for at least one second region of said two dimensional input image based upon said two dimensional input image and said depth map, and said processor generating a two dimensional image for said at least one first region of said two dimensional input image that is to be rendered as said two dimensional region based upon said two dimensional input image, where (i) said three dimensional image for said at least one second region of said two dimensional input image and (ii) said two dimensional image for said at least one first region of said two dimensional input image that is to be rendered as said two dimensional region, are non-overlapping with one another;
    (d) at least one of:
        (i) wherein a display selectively presents within said user interfaced (a) CPU performance; (b) memory performance; (c) buffer level; (d) progress of input; (e) progress of export; and (f) storage parameters; and
        (ii) wherein a display selectively presents within said user interface at least a group import selections of (a) clip details selection; (b) position field selection; (c) start field selection; (d) end field selection; (e)picon field selection; (f) import single frame selection; (g) import video clip selection; (h) compression selection; and (i) cancel import selection.

2. The method of claim 1 wherein said depth map is determined based upon control parameters received from said user input.

3. The method of claim 1 further comprising receiving a video stream that includes a series of said two dimensional input images and automatically determining a set of key frames within said video stream representative of a set of segments of said two dimensional input images and automatically applying the same control parameters used to determine said depth map to a first segment of said set of segments associated with a first one of said key frames and to a second segment of said set of segments associated with a second one of said key frames.

4. The method of claim 3 further comprising a display presenting a representation of said video stream within said user interface that further identifies said first and second one of said key frames.

5. The method of claim 4 wherein said control parameters applied to said first and second segments automatically varies said depth map.

6. The method of claim 5 wherein said automatically varied depth map is linear variation.

7. The method of claim 5 wherein said automatically varied depth map is a segmentation step.

8. The method of claim 5 wherein said automatically varied depth map is log variation.

9. The method of claim 5 wherein said automatically varied depth map is an inverse log variation.

10. The method of claim 3 further comprising at least one executable function associated with each of said first and second key frames that modifies aid first and second segments based upon said respective at least one executable function.

11. The method of claim 10, wherein said executable function is a group including (a) three dimensional text titles; (b) motion blur; (c) path of blur; (d) length of blur; and (e) depth of field.

12. The method of claim 1 wherein said depth map is determined based upon receiving input from an operations section of said user interface that includes controls and displays information on said user interface specific to the operation being performed.

13. The method of claim 12 wherein said operations section includes an operations selector that receives a selection of that comprises input, output, and setup.

14. The method of claim 13 wherein said operations selector indicates which operations it is currently set to.

15. The method of claim 1 wherein a display selectively presents within said user interface at least (a) play; (b) stop; (c) pause; (d) fast forward; (e) LTC information; (f) VITC information; (g) current time code information; (h) video display information; (i) fast reverse; and (j) loop.

16. The method of claim 1 wherein a display selectively presents within said user interface at least a group of export selections of (a) file saving location; (b) type of export data list; (c) file type; (d) compression setting; (e) bit depth; (f) range; (g) translation.

17. The method of claim 16 wherein said display selectively presents within said user interface at least a group of profile selections of (a) file type; (b) codec selection; (c) width of frame; (d) height of frame; (e) bit depth; (f) data rate; (g) key frame; (h) quality; and (i) audio settings.

18. The method of claim 1 further comprising receiving a video stream that includes a series of said two dimensional input images and determining a set of key frames within said video stream representative of a set of segments of said two dimensional input images and applying control parameters to a first segment of said set of segments associated with a first one of said key frames based upon a set of adjustments received from said user interface, wherein a first one of said set of adjustments includes a dynamic range control that selects an overall depth volume of said three dimensional image.

19. The method of claim 18 wherein a second one of said set of adjustments includes a zero plane position within said overall depth volume.

20. The method of claim 19 wherein a third one of said set of adjustments includes a segmentation break which defines another depth position within said overall depth volume which results in a modified said three dimensional image relative to said segmentation break.

21. The method of claim 20 wherein a fourth one of said set of adjustments includes a segmentation step which operates in conjunction with said segmentation break to move three dimensional content away from said segmentation break.

22. The method of claim 21 wherein a fifth one of said set of adjustments includes a segmentation scale which operates in conjunction with said segmentation break to stretch three dimensional content away from said segmentation break.

23. The method of claim 1 further comprising receiving from said user interface a segmentation of said two dimensional image for at least one region to be rendered in two dimensions and at least one region to be rendered as said three dimensional image.

24. The method of claim 23 further comprising receiving from said user interface a plurality of regions to be rendered in as said three dimensional image.

25. The method of claim 24 wherein said user interface selects a first set of control parameters for rendering one of said plurality of regions as said three dimensional image and a second set of control parameters for rendering another one of said plurality of regions as said three dimensional image, where said first set of control parameters are different from said second set of control parameters in the amount of depth of field.

26. The method of claim 1 further comprising receiving from said user interface a segmentation of said two dimensional image for said first region and modifying said generating said three dimensional image based upon said two dimensional input image and said depth map based upon said segmentation.

27. The method of claim 1 further comprising receiving from said user interface a right eye and left eye swap of said determine said depth map.

28. The method of claim 1 further comprising receiving from said user interface an artifact suppression that includes an intensity selector that selects a range of intensities and modifying said generating said three dimensional image based upon said two dimensional input image and said depth map based upon said range of intensities.

29. The method of claim 1 further comprising receiving from said user interface an artifact suppression that includes a hue selector that selects a range of hues and modifying said generating said three dimensional image based upon said two dimensional input image and said depth map based upon said range of hues.

30. The method of claim 1 further comprising receiving from said user interface an artifact suppression that includes a saturation selector that selects a range of saturations and modifying said generating said three dimensional image based upon said two dimensional input image and said depth map based upon said range of saturations.

31. The method of claim 1 further comprising receiving from said user interface an artifact suppression that includes a depth selector that selects a depth offset based upon a selected region and modifying said generating said three dimensional image based upon said two dimensional input image and said depth map based upon said depth offset.

32. The method of claim 1 further comprising receiving from said user interface an artifact suppression that includes an attenuation selector that selects an attenuation based upon a selected region and modifying said generating said three dimensional image based upon said two dimensional input image and said depth map based upon said attenuation.

* * * * *

UNITED STATES PATENT AND TRADEMARK OFFICE
CERTIFICATE OF CORRECTION

PATENT NO. : 10,158,847 B2  
APPLICATION NO. : 14/743793  
DATED : December 18, 2018  
INVENTOR(S) : Craig Peterson Page 1 of 1

It is certified that error appears in the above-identified patent and that said Letters Patent is hereby corrected as shown below:

In the Specification

Column 1, Line 55: Delete "there" and replace with --three--.

Signed and Sealed this  
Nineteenth Day of November, 2019

Andrei Iancu  
*Director of the United States Patent and Trademark Office*